(12) United States Patent
Hirose et al.

(10) Patent No.: US 9,127,796 B2
(45) Date of Patent: Sep. 8, 2015

(54) GASKET TYPE ORIFICE AND PRESSURE TYPE FLOW RATE CONTROL APPARATUS FOR WHICH THE ORIFICE IS EMPLOYED

(75) Inventors: Takashi Hirose, Osaka (JP); Tsutomu Shinohara, Osaka (JP); Toshihide Yoshida, Osaka (JP); Kohei Shigyou, Osaka (JP); Michio Yamaji, Osaka (JP)

(73) Assignee: FUJIKIN INCORPORATED, Osaka (JP)

( * ) Notice: Subject to any disclaimer, the term of this patent is extended or adjusted under 35 U.S.C. 154(b) by 812 days.

(21) Appl. No.: 13/169,971

(22) Filed: Jun. 27, 2011

(65) Prior Publication Data

US 2011/0315905 A1  Dec. 29, 2011

Related U.S. Application Data

(63) Continuation-in-part of application No. PCT/JP2009/006029, filed on Nov. 12, 2009.

(30) Foreign Application Priority Data

Dec. 26, 2008  (JP) ................. 2008-331743

(51) Int. Cl.
| | |
|---|---|
| *G05D 7/06* | (2006.01) |
| *F16L 23/20* | (2006.01) |
| *F15D 1/02* | (2006.01) |
| *G01F 1/40* | (2006.01) |
| *G01F 1/42* | (2006.01) |

(52) U.S. Cl.
CPC .................. *F16L 23/20* (2013.01); *F15D 1/025* (2013.01); *G01F 1/40* (2013.01); *G01F 1/42* (2013.01); *G05D 7/0635* (2013.01)

(58) Field of Classification Search
CPC ...... G05D 7/0635; F15D 1/025; F15D 1/0005
USPC ........ 137/487, 487.5; 138/44; 239/590.3, 596
See application file for complete search history.

(56) References Cited

U.S. PATENT DOCUMENTS

| | | | |
|---|---|---|---|
| 6,871,803 | B1 | 3/2005 | Ohmi et al. |
| 2009/0171507 | A1* | 7/2009 | Ohmi et al. ................... 700/282 |

FOREIGN PATENT DOCUMENTS

| | | |
|---|---|---|
| EP | 1 901 154 | 3/2008 |
| JP | 48-9323 | 4/1973 |
| JP | 64-45094 | 3/1989 |

(Continued)

OTHER PUBLICATIONS

International Search Report issued in corresponding International Application No. PCT/JP2009/006029, completed Feb. 2, 2010, mailed Feb. 9, 2010.

*Primary Examiner* — William McCalister
(74) *Attorney, Agent, or Firm* — Griffin & Szipl, P.C.

(57) ABSTRACT

A gasket type orifice includes a first orifice base having a through-type passage in a central area thereof, a second orifice base having in a central area thereof a through-type passage communicating with the passage of the first orifice base, and an orifice plate having an orifice hole formed in a central area thereof, wherein the orifice plate is mounted by insertion in an airtight manner between both orifice bases, and the gasket type orifice is installed in a fluid passage, in which the outer end faces of both orifice bases respectively serve as sealing faces, and an outer diameter of the second orifice base, located on the downstream side, is larger than an outer diameter of the first orifice base located on the upstream side, and an outer peripheral edge portion of an inner end face of the second orifice base serves as another sealing face.

6 Claims, 10 Drawing Sheets

(56) References Cited

FOREIGN PATENT DOCUMENTS

| | | |
|---|---|---|
| JP | 2000-213667 A | 8/2000 |
| JP | 2007-004644 A | 1/2007 |
| JP | 2007057474 A | 3/2007 |
| WO | WO2007023597 * | 3/2007 .............. F16K 27/00 |

* cited by examiner

A plane   B plane   C plane

PRIOR ART ated Patent Application No. 2008-331743, filed Dec. 26, 2008. The entire disclosures of the above patent applications are hereby incorporated by reference.

GASKET TYPE ORIFICE AND PRESSURE TYPE FLOW RATE CONTROL APPARATUS FOR WHICH THE ORIFICE IS EMPLOYED

This is a Continuation-in-Part Application in the United States of International Patent Application No. PCT/JP2009/006029 filed Nov. 12, 2009, which claims priority on Japanese Patent Application No. 2008-331743, filed Dec. 26, 2008. The entire disclosures of the above patent applications are hereby incorporated by reference.

TECHNICAL FIELD OF THE INVENTION

The present invention relates to a gasket type orifice employed for a pressure type flow rate control apparatus, which is installed in a fluid supply line for semiconductor manufacturing facilities, chemical industrial facilities, medical industrial facilities, food industrial facilities, and the like, in order to perform fluid flow rate control, and a pressure type flow rate control apparatus in which the orifice is employed. In particular, the present invention relates to a gasket type orifice that has a superior sealing performance and enables space-saving, and a pressure type flow rate control apparatus in which the orifice is employed.

FIELD OF THE INVENTION

Background Art

Conventionally, this kind of gasket type orifice, and pressure type flow rate control apparatus for which the orifice is employed, for example, have been known and have structures such as those disclosed in Japanese Published Unexamined Patent Application No. 2007-057474 (referred hereinafter as Patent Document 1).

That is, as shown in FIG. 19, the conventional gasket type orifice 20 is configured so that an orifice base 21, having a fitting protruding portion 21a, and an orifice base 22, having a fitting concave portion 22a, are combined. Furthermore, an orifice plate 23, having an orifice hole (not illustrated) formed therein, is mounted by insertion in an airtight manner between end faces of both orifice bases 21 and 22, and the outer end faces of both orifice bases 21 and 22, respectively, serve as sealing faces 21b and 22b.

Because the gasket type orifice 20 is configured so that the orifice plate 23 is mounted, by insertion, between both orifice bases 21 and 22, whose outer end faces serve as the sealing faces 21b and 22b, the orifice plate 23 can be held between both orifice bases 21 and 22 so as not to be deformed. As a result, there are advantages of being able to use an orifice plate 23 made of an ultrathin metal plate and having a high precision orifice hole, and of being able to incorporate the orifice plate 23 into a pressure type flow rate control apparatus so not to cause a deformation.

Furthermore, although not illustrated, the pressure type flow rate control apparatus, in which the gasket type orifice 20 is employed, includes a control valve, wherein the gasket type orifice 20 is installed in a fluid passage on a downstream side of the control valve, and a pressure sensor is installed on an upstream side of the gasket type orifice 20 to detect pressure on the upstream side of the gasket type orifice 20. The pressure type flow rate control apparatus also includes a control circuit that controls the control valve, and the pressure type flow rate control apparatus is configured to control an orifice passing flow rate by opening and closing the control valve using pressure on the upstream side of the gasket type orifice 20 while calculating an orifice passing flow rate.

Because this pressure type flow rate control apparatus uses the gasket type orifice 20 described above, there is an advantage of being able to prevent deformation of the orifice plate 23 when mounting the orifice 20.

Meanwhile, because the conventional gasket type orifice 20 is configured so that the outer end faces of both orifice bases 21 and 22, respectively, serve as the sealing faces 21b and 22b, it is possible to sufficiently secure the sealing performances of both end faces of the gasket type orifice 20 when the gasket type orifice 20 is incorporated into a fluid passage of a pressure type flow rate control apparatus.

However, because the gasket type orifice 20 is configured so that the orifice plate 23 is accommodated in the fitting concave portion 22a of the orifice base 22, and the fitting protruding portion 21a of the orifice base 21 is pressed into the fitting concave portion 22a of the orifice base 22 to mount the orifice plate 23, by insertion, in an airtight manner between both orifice bases 21 and 22, the gasket type orifice 20 has a problem. In particular, it becomes necessary to pay careful attention to the process for mounting the orifice plate 23, by insertion, in order to completely prevent an external leak from a sealing part of the orifice plate 23.

On the other hand, as a pressure type flow rate control apparatus, for which the orifice is used, there has been developed a pressure type flow rate control apparatus in which two parallel fluid passages are formed on a downstream side of the control valve. In such a pressure type flow rate control apparatus, a low flow rate orifice is provided in one of the fluid passages, and a switching valve and a high flow rate orifice are provided in the other one of the fluid passages, so that the pressure type flow rate control apparatus is capable of switching its fluid flow rate control range between a low flow rate region and a high flow rate region by turning on a switching valve, in order to perform highly accurate flow rate control over a broad range of flow rate regions (refer to Patent Document 2, for example). FIG. 20 shows a longitudinal sectional view of a pressure type flow rate control apparatus in which two orifices are employed. In FIG. 20, reference numeral 24 denotes a control valve, reference numeral 25 denotes a switching valve, reference numeral 26 denotes a body used for both the control valve 24 and the switching valve 25, reference numeral 26a denotes an upstream side fluid passage formed in the body 26, reference numerals 26b denote two downstream side fluid passages formed in parallel in the body 26, reference numeral 27 denotes an inlet side block fixed to the upstream side of the body 26, reference numeral 27a denotes an inlet side fluid passage formed in the inlet side block 27, reference numeral 28 denotes an outlet side block fixed to the downstream side of the body 26, reference numeral 28a denotes an outlet side fluid passage formed in the outlet side block 28, reference numeral 29 denotes a low flow rate gasket type orifice installed in one downstream side fluid passage 26b (i.e., the low flow rate gasket type orifice here is the same as the gasket type orifice 20 shown in FIG. 19), reference numeral 30 denotes a high flow rate gasket type orifice installed in the other downstream side fluid passage 26b (that is, the high flow rate gasket type orifice 30 is a gasket type orifice having another structure which is different from that shown in FIG. 19), reference numeral 31 denotes a pressure sensor installed in the body 26, and reference numeral 32 denotes a gasket type filter inserted between the body 26 and the inlet side block 27. In addition, the low flow rate gasket type orifice 29 and the high flow rate gasket type orifice 30 having the same structure may be used, and only the hole diameters of the orifices thereof may be changed.

Meanwhile, in the case where the gasket type orifices are employed for a pressure type flow rate control apparatus, it is necessary to separately provide the two gasket type orifices 29 and 30 with different flow rate characteristics in the two fluid passages 26b and 26b formed in parallel, which brings about a problem in that the pressure type flow rate control apparatus prohibits space-saving. That is to say that the structure cannot be made compactly. Furthermore, in the case where the gasket type orifice 20, having the structure shown in FIG. 19, is employed as an orifice, there is a problem that it becomes necessary to pay careful attention to the process for mounting the orifice plate 23, by insertion, in order to completely prevent an external leak from the sealing part of the orifice plate 23.

PRIOR ART DOCUMENTS

Patent Documents

Patent Document 1: Japanese Published Unexamined Patent Application No. 2007-057474
Patent Document 2: Japanese Published Unexamined Patent Application No. 2007-004644

SUMMARY OF THE INVENTION

Problems to be Solved by the Invention

The present invention has been achieved, in consideration of the problems described above, and an object of the present invention is to provide a gasket type orifice that has a superior sealing performance and that enables space-saving, and to provide a pressure type flow rate control apparatus in which the gasket type orifice is employed.

Means for Solving the Aforesaid Problems

In order to achieve the above-described objectives, a gasket type orifice, according to a first embodiment of the present invention, includes (a) a first orifice base having a through-type passage in a central area thereof, (b) a second orifice base having in a central area thereof a through-type passage communicating with the passage of the first orifice base, and (c) an orifice plate having an orifice hole formed in a central area thereof, wherein the orifice plate is mounted by insertion in an airtight manner between the first and second orifice bases, and the gasket type orifice is installed in a fluid passage, in which outer end faces of the first and second orifice bases, respectively, serve as sealing faces, and an outer diameter of the orifice base located on a downstream side is formed larger than an outer diameter of the orifice base located on an upstream side, and an outer peripheral edge portion of an inner end face of the orifice base located on the downstream side serves as a sealing face.

Furthermore, in the gasket type orifice, according to another embodiment of the present invention, one of the first and second orifice bases is formed into a convex orifice base having a fitting protruding portion on an inner end face thereof, and the other one of the first and second orifice bases is formed into a concave orifice base having a fitting concave portion in the inner end face, into which the fitting protruding portion of the convex orifice base is fitted in an airtight manner.

Furthermore, in the gasket type orifice, according to another embodiment of the present invention, the orifice plate has the orifice hole formed in the central area thereof to communicate with the passage of the convex orifice base and the passage of the concave orifice base, and the orifice plate is mounted by insertion in an airtight manner between the fitting protruding portion of the convex orifice base and the fitting concave portion of the concave orifice base.

Furthermore, a gasket type orifice, according to a second embodiment of the present invention, includes (a) an upstream side orifice base having a passage in a central area thereof, (b) a downstream side orifice base having a passage in a central area thereof, wherein the downstream side orifice base is installed to be connected to the upstream side orifice base so as to be formed to have a diameter larger than a diameter of the upstream side orifice base, and (c) a bulkhead type orifice part having an orifice hole formed in a central area thereof, which makes the passages of both orifice bases communicate with one another, wherein the bulkhead type orifice part is formed between both passages, and the gasket type orifice is installed in a fluid passage, in which outer end faces of both orifice bases and an outer peripheral edge portion of an inner end face of the downstream side orifice base, respectively, serve as sealing faces.

Furthermore, a gasket type orifice, according to a third embodiment of the present invention, includes (a) a first orifice base having a through-type passage in a central area thereof, (b) a second orifice base having a through-type passage in a central area thereof, (c) a middle orifice base that has in a central area thereof a through-type passage communicating with the passages of both the first and second orifice bases, and whose one end face faces one of the first and second orifice bases and whose other end face faces the other one of the first and second orifice bases, (d) a first orifice plate having an orifice hole formed in a central area thereof, wherein the first orifice plate is mounted by insertion in an airtight manner between the one orifice base and the middle orifice base, (e) a second orifice plate having an orifice hole formed in a central area thereof, wherein the second orifice plate is mounted by insertion in an airtight manner between the middle orifice base and the other orifice base, wherein the gasket type orifice is installed in a fluid passage, in which outer end faces of both of the first and second orifice bases, respectively, serve as sealing faces, and an outer diameter of the orifice base located on a downstream side is formed larger than the outer diameter of the orifice base located on an upstream side and is formed larger than the outer diameter of the middle orifice base, and an outer peripheral edge portion of an inner end face of the orifice base located on the downstream side serves as a sealing face, and a flow dividing passage formed in the middle orifice base divergingly communicates with the passage of the middle orifice base.

Furthermore, in the gasket type orifice, according to another embodiment of the present invention, one of the orifice bases is formed into a convex orifice base having a fitting protruding portion on an inner end face thereof, and the other one of the orifice bases is formed into a concave orifice base having a fitting concave portion in the inner end face thereof, and a middle orifice base is formed into a middle orifice base having a fitting concave portion in one end face thereof, into which the fitting protruding portion of the convex orifice base is fitted in an airtight manner, and the middle orifice base has a fitting protruding portion on the other end face, which is fitted in an airtight manner into the fitting concave portion of the concave orifice base.

Furthermore, in the gasket type orifice, according to another embodiment of the present invention, the one orifice plate has the orifice hole formed in the central area thereof to communicate with the passage of the convex orifice base and the passage of the middle orifice base, and the one orifice plate is mounted by insertion in an airtight manner between the fitting protruding portion of the convex orifice base and the fitting concave portion of the middle orifice base.

Furthermore, in the gasket type orifice, according to another embodiment of the present invention, the other orifice plate has the orifice hole formed in the central area thereof to communicate with the passage of the middle orifice base and the passage of the concave orifice base, and the other orifice plate is mounted by insertion in an airtight manner between the fitting protruding portion of the middle orifice base and the fitting concave portion of the concave orifice base.

Furthermore, in the gasket type orifice, according to another embodiment of the present invention, the orifice plate located on the upstream side between both orifice plates serves as a low flow rate orifice plate, and the orifice plate located on the downstream side serves as a high flow rate orifice plate.

Furthermore, a gasket type orifice, according to a fourth embodiment of the present invention, includes (a) an upstream side orifice base having a passage formed in a central area thereof, (b) a middle orifice base having a passage formed in a central area thereof, wherein the middle orifice base is installed to be connected to the upstream side orifice base, (c) a downstream side orifice base having in a central area thereof a through-type passage communicating with the passage of the middle orifice base, wherein the downstream side orifice base faces the middle orifice base, (d) a bulkhead type orifice part having an orifice hole formed in a central area thereof, which makes the passage of the upstream side orifice base and the passage of the middle orifice base communicate with one another, wherein the bulkhead type orifice part is formed between both passages (i.e., the passage of the upstream side orifice base and the passage of the middle orifice base), and (e) an orifice plate having an orifice hole formed in a central area thereof, wherein the orifice plate is mounted by insertion, in an airtight manner, between the middle orifice base and the downstream side orifice base, and wherein the gasket type orifice is installed in a fluid passage, in which an outer end face of the upstream side orifice base and an outer end face of the downstream side orifice base, respectively, serve as sealing faces, and an outer diameter of the downstream side orifice base is formed larger than outer diameters of the upstream side orifice base and of the middle orifice base, and an outer peripheral edge portion of an inner end face of the downstream side orifice base serves as a sealing face, and a flow dividing passage is formed in the middle orifice base so as to divergingly communicate with the passage of the middle orifice base.

Furthermore, in the gasket type orifice, according to another embodiment of the present invention, the orifice part located on the upstream side serves as a low flow rate orifice part, and the orifice plate located on the downstream side serves as a high flow rate orifice plate.

Furthermore, a gasket type orifice, according to a fifth embodiment of the present invention, includes (a) an upstream side orifice base having a through-type passage formed in a central area thereof, (b) a middle orifice base having a passage formed in a central area thereof, wherein the middle orifice base faces the upstream side orifice base, (c) a downstream side orifice base having a passage formed in a central area thereof, wherein the downstream side orifice base is installed to be connected to the middle orifice base, (d) an orifice plate having an orifice hole formed in a central area thereof, wherein the orifice plate is mounted, by insertion, in an airtight manner between the upstream side orifice base and the middle orifice base, and (e) a bulkhead type orifice part having an orifice hole formed in a central area thereof, which makes the passage of the middle orifice base and the passage of the downstream side orifice base communicate with one another, wherein the bulkhead type orifice part is formed between both the passage of the middle orifice base and the passage of the downstream side orifice base, wherein the gasket type orifice is installed in a fluid passage, in which an outer end face of the upstream side orifice base and an outer end face of the downstream side orifice base, respectively, serve as sealing faces, and an outer diameter of the downstream side orifice base is formed larger than outer diameters of the upstream side orifice base and of the middle orifice base, and an outer peripheral edge portion of an inner end face of the downstream side orifice base serves as a sealing face, and a flow dividing passage formed in the middle orifice base divergingly communicates with the passage of the middle orifice base.

Furthermore, in the gasket type orifice, according to another embodiment of the present invention, the orifice plate located on the upstream side serves as a low flow rate orifice plate, and the orifice part located on the downstream side serves as a high flow rate orifice part.

Furthermore, a gasket type orifice, according to a sixth embodiment of the present invention, includes (a) an upstream side orifice base having a passage formed in a central area thereof, (b) a middle orifice base having a passage formed in a central area thereof, wherein the middle orifice base is installed so as to be connected to the upstream side orifice base, (c) a downstream side orifice base having a passage formed in a central area thereof, wherein the downstream side orifice base is installed to be connected to the middle orifice base, (d) a bulkhead type orifice part having an orifice hole formed in a central area thereof, which makes the passage of the upstream side orifice base and the passage of the middle orifice base communicate with one another, wherein the bulkhead type orifice part is formed between both the passage of the upstream side orifice base and the passage of the middle orifice base, and (e) a bulkhead type orifice part having an orifice hole formed in a central area thereof, makes the passage of the middle orifice base and the passage of the downstream side orifice base communicate with one another, wherein the bulkhead type orifice part is formed between both the passage of the middle orifice base and the passage of the downstream side orifice base, wherein the gasket type orifice is installed in a fluid passage, in which an outer end face of the upstream side orifice base and an outer end face of the downstream side orifice base, respectively, serve as sealing faces, and an outer diameter of the downstream side orifice base is formed larger than outer diameters of the upstream side orifice base and of the middle orifice base, wherein an outer peripheral edge portion of an inner end face of the downstream side orifice base serves as a sealing face, and a flow dividing passage formed in the middle orifice base divergingly communicates with the passage of the middle orifice base.

Furthermore, in the gasket type orifice, according to another embodiment of the present invention, the orifice part located on the upstream side serves as a low flow rate orifice part, and the orifice part located on the downstream side serves as a high flow rate orifice part.

Furthermore, in the gasket type orifice, according to another embodiment of the present invention, the sealing face formed on the outer end face of the downstream side orifice base is a bottom face of a recess provided in the outer end face of the orifice base.

A pressure type flow rate control apparatus, according to another embodiment of the present invention, includes (1) a control valve, (2) the gasket type orifice according to any one of the first embodiment, the second embodiment, the third embodiment, and the fourth embodiment of the present invention, which is installed in a downstream side fluid passage of the control valve, (3) a pressure sensor that is installed on an upstream side of the gasket type orifice to detect pressure on the upstream side of the gasket type orifice, and (4) a control circuit that controls the control valve, wherein the pressure type flow rate control apparatus is configured to control an orifice passing flow rate by opening and closing the control valve with the pressure on the upstream side of the gasket type orifice while calculating an orifice passing flow rate.

Furthermore, a pressure type flow rate control apparatus, according to another embodiment of the present invention, includes (1) a control valve, (2) a switching valve installed in a flow dividing passage that diverges from a fluid passage on a downstream side of the control valve to flow into the fluid passage again, wherein (3) a gasket type orifice according to any one of the above-mentioned gasket type orifice embodiments is installed at a junction point between the fluid passage and the flow dividing passage to communicate, respectively, with the fluid passage and the flow dividing passage, (4) a pressure sensor that is installed on an upstream side of the gasket type orifice to detect pressure on the upstream side of the gasket type orifice, and (5) a control circuit that controls the control valve, and wherein the pressure type flow rate control apparatus is configured to control an orifice passing flow rate by opening and closing the control valve using the pressure on the upstream side of the gasket type orifice while calculating an orifice passing flow rate, and the pressure type flow rate control apparatus is configured to be capable of switching a flow passage for fluid by turning on the switching valve.

Furthermore, in the pressure type flow rate control apparatus, according to another embodiment of the present invention, between both orifice plates, or between the orifice part and the orifice plate, or between both orifice parts, the orifice plate or the orifice part located on the upstream side serves as a low flow rate orifice plate or orifice part, and the orifice plate or the orifice part located on the downstream side serves as a high flow rate orifice plate or orifice part, and the pressure type flow rate control apparatus is configured to be capable of switching a fluid flow rate control range between a low flow rate region and a high flow rate region by turning on the switching valve.

Furthermore, in the pressure type flow rate control apparatus, according to another embodiment of the present invention, two types of fluids to be circulated are supplied to the same passages, and when flowing one of the fluids, the switching valve is closed to control a flow rate with the control valve, and when flowing the other fluid, the switching valve is opened to control a flow rate.

Furthermore, in the pressure type flow rate control apparatus according to another embodiment of the present invention, in place of the flow dividing passage that diverges from the fluid passage on the downstream side of the control valve, a flow passage from another fluid supply line is connected to the fluid passage, and the gasket type orifice according to any one of the previously described gasket type orifice embodiments, which communicates respectively with the fluid passage and the other flow passage, is installed at a connecting point between the flow passage and the fluid passage, and the switching valve is installed in the other flow passage to make a flowing fluid flow from the other flow passage with the switching valve.

Effects of the Invention

In the gasket type orifice, according to various embodiments of the present invention, because the orifice plate is mounted, by insertion in an airtight manner between both orifice bases, the outer diameter of the orifice base located on the downstream side is formed larger than the outer diameter of the orifice base located on the upstream side, and the outer peripheral edge portion of the inner end face of the orifice base located on the downstream side serves as a sealing face, wherein the sealing part of the orifice plate is located medially of the sealing face formed on the outer peripheral edge portion of the inner end face of the orifice base located on the downstream side, which makes it possible to completely prevent an external leak from the sealing part of the orifice plate. Furthermore, in the gasket type orifice according to various embodiments of the present invention, because the sealing face is formed on the outer peripheral edge portion of the inner end face of the orifice base located on the downstream side, even if there is leakage from the sealing face formed on the outer end face of the orifice base located on the upstream side, or the sealing part of the orifice plate, it is possible to prevent leakage of fluid to the exterior from the sealing face of the orifice base located on the downstream side, which makes it possible to slow the leak rate from the sealing part of the orifice plate so as to have no effect on flow rate control. Moreover, in the gasket type orifice according to various embodiments of the present invention, because the outer end faces of both orifice bases, respectively, serve as sealing faces, it is possible to tightly fasten these components and to fix the gasket type orifice to the fluid passage, or to the pipe passage, and additionally, there are three sealing areas, that leads to an extremely superior sealing performance.

Furthermore, in the gasket type orifice according to various embodiments of the present invention, one orifice base is formed into a convex orifice base having a fitting protruding portion located on the inner end face thereof, and the other orifice base is formed into a concave orifice base having the fitting concave portion formed in the inner end face thereof, into which the fitting protruding portion of the convex orifice base is fitted in an air tight manner, and the orifice plate is mounted by insertion in an airtight manner between the fitting protruding portion of the convex orifice base and the fitting concave portion of the concave orifice base, so that the gasket type orifice is capable of completely preventing an external leak from the sealing part of the orifice plate.

Furthermore, in the gasket type orifice according to various embodiments of the present invention, because the upstream side orifice base and the downstream side orifice base are integrally formed, and the orifice part having the orifice hole formed therein, which is disposed so that the passage of the upstream side orifice base and the passage of the downstream side orifice base communicate with one another, is provided between both passages, there is no external leak from the orifice part.

Furthermore, in the gasket type orifice according to various embodiments of the present invention, because the orifice plates are respectively mounted, by insertion in an airtight manner, between one orifice base and the middle orifice base, and between the other orifice base and the middle orifice base, the outer diameter of the orifice base located on the downstream side is formed larger than the outer diameters of the orifice base located on the upstream side and the middle orifice base, and the outer peripheral edge portion of an inner end face of the orifice base located on the downstream side serves as a sealing face, and the sealing part of the orifice plate is located medially of the sealing face formed on the outer peripheral edge portion of the inner end face of the orifice base located on the downstream side, which makes it possible to completely prevent an external leak from the sealing part of the orifice plate. Furthermore, in the gasket type orifice according to various embodiments of the present invention, because the sealing face is formed on the outer peripheral edge portion of the inner end face of the orifice base located on the downstream side, even if there is leakage from the sealing face formed on the outer end face of the orifice base located on the upstream side, or the sealing part of the orifice plate, it is possible to prevent leakage of fluid to the exterior by the sealing face of the orifice base located on the downstream side, which makes it possible to slow the leak rate from the sealing part of the orifice plate so as to have no effect on flow rate control. Moreover, in the gasket type orifice according to various embodiments of the present invention, because the outer end faces of both orifice bases, respectively, serve as sealing faces, it is possible to tightly fasten components to fix the gasket type orifice to the fluid passage or the pipe passage, and additionally, there are three sealing areas, which lead to an extremely superior sealing performance.

Furthermore, in the gasket type orifice according to various embodiments of the present invention, one orifice base is formed into a convex orifice base having the fitting protruding portion disposed on the inner end face thereof, and the other orifice base is formed into a concave orifice base having the fitting concave portion formed in the inner end face thereof, and the middle orifice base is formed into a middle orifice base having the fitting concave portion in one end face thereof, into which the fitting protruding portion of the convex orifice base is fitted in an air tight manner, and having the fitting protruding portion on the other end face, which is fitted in an airtight manner into the fitting concave portion of the concave orifice base, and the orifice plates are respectively mounted, by insertion in an airtight manner, between the fitting protruding portion of the convex orifice base and the fitting concave portion of the middle orifice base, and between the fitting protruding portion of the middle orifice base and the fitting concave portion of the concave orifice base, so that the gasket type orifice is capable of completely preventing an external leak from the sealing part of the orifice plate.

Furthermore, in the gasket type orifice according to various embodiments of the present invention, because the upstream side orifice base and the middle orifice base, the middle orifice base and the downstream side orifice base, and the upstream side orifice base, the middle orifice base, and the downstream side orifice base are, respectively, integrally formed, and because the orifice parts having the orifice holes formed therein are provided, respectively, between the passage of the upstream side orifice base and the passage of the middle orifice base, and between the passage of the middle orifice base and the passage of the downstream side orifice base, there is no external leak from the orifice part.

Furthermore, in the gasket type orifice according to the present invention, because the upstream side orifice plate or orifice part serves as a low flow rate orifice plate or orifice part, and the downstream side orifice plate or orifice part serves as a high flow rate orifice plate or orifice part, the one gasket type orifice is capable of having two different flow rate characteristics. As a result, provided that the gasket type orifice according to the present invention is employed, it is possible to achieve space-saving as compared with a pressure type flow rate control apparatus employing the two separate gasket type orifices as is conventionally known (see, e.g., FIG. 20).

Furthermore, in the gasket type orifice according to various embodiments of the present invention, because a recess is formed in the outer end face of the downstream side orifice base and because the bottom face of the recess serves as a sealing face, the sealing face can be protected by the recess, and further, provided that another member is fitted into the recess to seal it, the recess fulfills a positioning function. In this case, the recess is capable of facilitating positioning (alignment) of the gasket type orifice.

Furthermore, because the pressure type flow rate control apparatus of the present invention uses the gasket type orifice according to the various embodiments of present invention, it is possible to make the orifice itself highly accurately, and it is possible to secure airtightness, and to securely prevent deformation when installing the orifice. In view of these features, the invention also permits the performance of highly accurate flow rate control.

Furthermore, the pressure type flow rate control apparatus, of additional embodiments of the present invention, is provided with a gasket type orifice including a low flow rate orifice plate or orifice part, and a high flow rate orifice plate or orifice part, and a switching valve that switches a flow of fluid, so that the pressure type flow rate control apparatus is capable of performing flow rate control in which flow rate control by the low flow rate orifice plate or orifice part, and flow rate control by the high flow rate orifice plate or orifice part, are appropriately combined, to perform highly accurate flow rate control over a broad range of flow rate regions (i.e., both low flow rates and high flow rates) by using only one pressure type flow rate control apparatus.

DETAILED DESCRIPTION OF THE INVENTION

Modes for Carrying Out the Invention

Hereinafter, an embodiment of the present invention will be described with reference to the accompanying drawings, where like parts are designated by like character references. FIGS. 1 to 4 show a gasket type orifice 1, according to an embodiment of the present invention, and a pressure type flow rate control apparatus in which the gasket type orifice 1 is employed.

Figure 1:
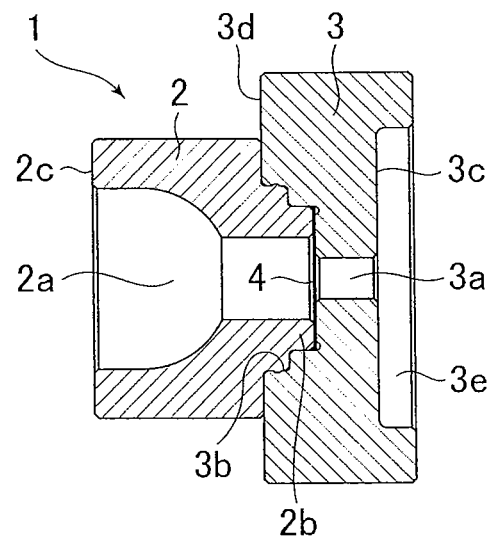
FIG. 1 is an enlarged longitudinal sectional view of a gasket type orifice, in an assembled state, according to an embodiment of the present invention.
Figure 2:
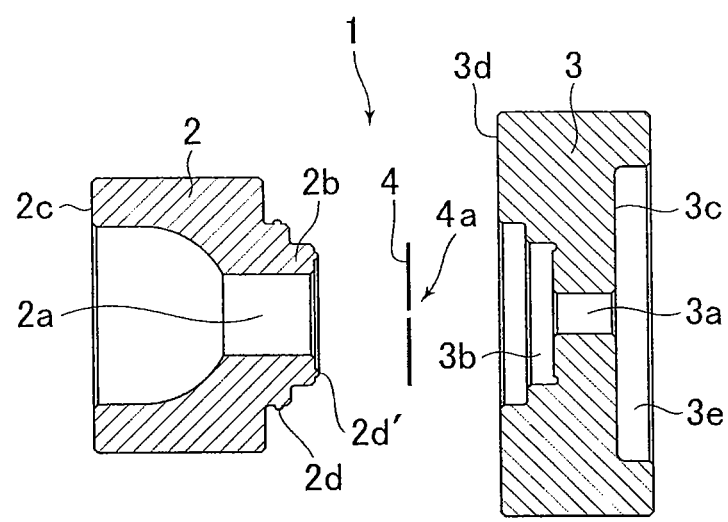
FIG. 2 is an enlarged longitudinal sectional view of the gasket type orifice shown in FIG. 1, which is in a disassembled state.

As shown in FIGS. 1 and 2, the gasket type orifice 1 includes (i) a convex orifice base 2, which has a through-type passage 2a formed in the central area thereof, and the convex orifice base 2 includes a fitting protruding portion 2b disposed on the inner end face thereof, (ii) a concave orifice base 3, which has a through-type passage 3a formed in the central area thereof and the concave orifice base 3 includes a fitting concave portion 3b formed in the inner end face thereof, and (iii) an orifice plate 4 having an orifice hole 4a (see FIG. 2) formed in the central area thereof, wherein the convex orifice base 2 and the concave orifice base 3 are combined to mount the orifice plate 4 by insertion, in an airtight manner, between both orifice bases 2 and 3, wherein both outer end faces of both orifice bases 2 and 3, respectively, and the inner end face of the one orifice base 3 serve as sealing faces 2c, 3c, and 3d, respectively, of the gasket type orifice 1, so that the gasket type orifice 1 is capable of preventing an external leak from the sealing part(s) of the orifice plate 4.

In more detail, as shown in FIG. 2, the convex orifice base 2 is formed into a convex short cylinder shape, as a cross-sectional shape from a stainless steel material (SUS316L-P (W melt)), and the through-type passage 2a, whose inner peripheral face is formed to be stepped, is formed in the central area of the convex orifice base 2. Furthermore, the tubular fitting protruding portion 2b of the convex orifice base 2, whose outer peripheral face is formed to be stepped, is formed to protrude concentrically with the passage 2a on the inner end face of the convex orifice base 2 (i.e., the end face facing the concave orifice base 3). Annular protrusions 2d and 2d', which fulfill their sealing functions when they are assembled with the concave orifice base 3, are respectively formed on the outer peripheral face on the large-diameter side of the fitting protruding portion 2b and on the end face of the fitting protruding portion 2b. Moreover, the convex orifice base 2 is configured to make the outer end face formed annularly in order to function as the sealing face 2c of the gasket type orifice 1.

As shown in FIG. 2, the concave orifice base 3 is formed into a concave thick-walled disc shape as a cross-sectional shape from a stainless steel material (SUS316L-P (W melt)), and the through-type passage 3a, which communicates with the passage 2a of the convex orifice base 2, is formed in the central area of the concave orifice base 3. Furthermore, the fitting concave portion 3b, into which the fitting protruding portion 2b of the convex orifice base 2 is fitted in an airtight manner, is formed concentrically with the passage 3a in the inner end face of the concave orifice base 3 (i.e., the end face facing the convex orifice base 2). The inner peripheral face of the fitting concave portion 3b is formed into a stepped inner peripheral face so that the fitting protruding portion 2b of the convex orifice base 2 is fitted into the fitting concave portion 3b in an airtight manner. Moreover, a circular recess 3e is formed concentrically with the passage 3a in the outer end face of the concave orifice base 3, so that the bottom face of the recess 3e is formed in the outer end face of the concave orifice base 3 in order to function as the sealing face 3c of the gasket type orifice 1. The recess 3e is also used for facilitating positioning (aligning) of the gasket type orifice 1 and serves to protect the sealing face 3c.

Then, at the boundary of the orifice base 3, located on the downstream side, between both orifice bases 2 and 3, the orifice base 3 is formed to have an outer diameter larger than the outer diameter of the orifice base 2 located on the upstream side. The outer peripheral edge portion of the inner end face of the orifice base 3, located on the downstream side, functions as the sealing face 3d of the gasket type orifice 1. In this embodiment, the outer diameter of the concave orifice base 3, which is located on the downstream side, is formed to be larger than the outer diameter of the convex orifice base 2 located on the upstream side, and the outer peripheral edge portion of the inner end face of the concave orifice base 3 serves as the sealing face 3d of the gasket type orifice 1.

The orifice plate 4 is formed into an ultrathin plate shape from a stainless steel material of the same quality as both orifice bases 2 and 3, or the orifice plate 4 is formed from a stainless steel material (NK clean Z) containing an extremely low impurity. The orifice hole of a desired inner diameter (not illustrated in more detail than in FIG. 2), which communicates with the passages 2a and 3a of the orifice bases 2 and 3, respectively, is formed in the central area of the orifice plate 4. The size of the orifice plate 4 is set to be able to be accommodated in the small diameter portion of the fitting concave portion 3b of the concave orifice base 3. In addition, the exterior shape of the orifice plate 4 may be circular, or it may be another shape.

The gasket type orifice 1 embodiment described above is formed such that the orifice plate 4 is accommodated in the fitting concave portion 3b of the concave orifice base 3, and the fitting protruding portion 2b of the convex orifice base 2 is pressed into the fitting concave portion 3b of the concave orifice base 3 at a thrust force of approximately 90N by a press machine (not illustrated), in order to integrate both orifice bases 2 and 3 in an airtight manner. After this press fitting operation, the outer peripheral face of the fitting protruding portion 2b closely contacts the inner peripheral face of the fitting concave portion 3b in an airtight manner, and both faces of the orifice plate 4 closely contact the end face of the fitting protruding portion 2b and the bottom face of the fitting concave portion 3b, respectively, so that the orifice plate 4 is firmly mounted, by insertion in an airtight manner, between the inner end faces of both orifice bases 2 and 3. Furthermore, the annular protrusions 2d and 2d' are formed on the outer peripheral face, and on the end face of the fitting protruding portion 2b, respectively, so that sealing performance is further secured.

Figure 3:
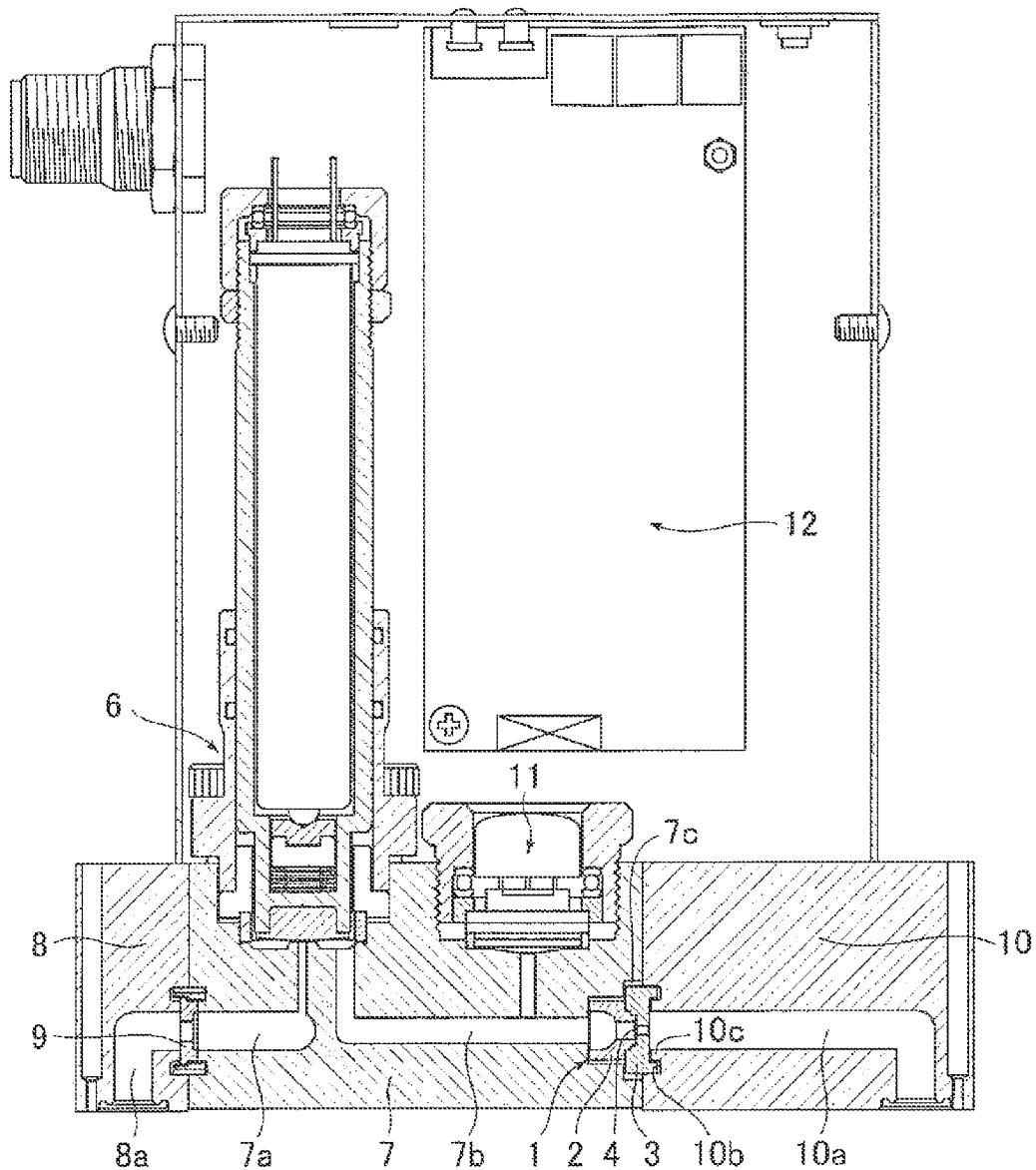
FIG. 3 is a longitudinal sectional view of a pressure type flow rate control apparatus in which the gasket type orifice shown in FIG. 1 is employed.

As shown in FIG. 3, the pressure type flow rate control apparatus, in which the gasket type orifice 1 is employed, includes (A) a piezoelectric element-driven control valve 6, (B) an inlet side block 8 having an inlet side fluid passage 8a formed therein and communicating with an upstream side fluid passage 7a formed in a body 7 of the control valve 6, wherein the inlet side block 8 is fastened to be fixed to the upstream side of the body 7 with a bolt (not illustrated), (C) a gasket type filter 9 that is inserted between the body 7 and the inlet side block 8 in order to provide a seal between both the body 7 and the inlet side block 8, (D) an outlet side block 10 having an outlet side fluid passage 10a formed therein to communicate with a downstream side fluid passage 7b formed in the body 7 of the control valve 6, wherein the outlet side block 10 is fastened to be fixed to the downstream side of the body 7 with a bolt (not illustrated), wherein the gasket type orifice 1 for flow rate control is inserted between the body 7 and the outlet side block 10 in order to seal both the body 7 and the outlet side block 10, (E) a pressure sensor 11 that is installed in the body 7 of the control valve 6 in order to detect pressure on the upstream side of the gasket type orifice 1, and (F) a control circuit 12 that that is operably connected to control the control valve 6. The pressure type flow rate control apparatus, in accordance with the present invention, is configured to control an orifice passing flow rate by opening and closing the control valve 6 using pressure on the upstream side of the gasket type orifice 1 while calculating an orifice passing flow rate.

Furthermore, orifice storage recesses 7c and 10b, in which the gasket type orifice 1 is accommodated, are respectively formed in the downstream side end face of the body 7 of the control valve 6 and in the upstream side end face of the outlet side block 10.

Figure 4:
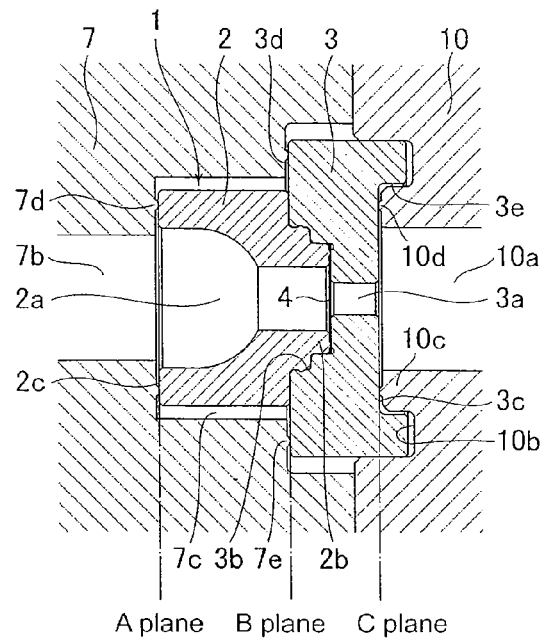
FIG. 4 is an enlarged longitudinal sectional view of a portion the pressure type flow rate control apparatus of FIG. 3, which includes a gasket type orifice of FIG. 1.

In other words, as shown in FIG. 4, the orifice storage recess 7c, formed in the downstream side end face of the body 7, is formed to be a stepped recess whose inner diameter changes along the way (i.e., along its length in the downstream direction). An annular protrusion 7d, which closely contacts sealing face 2c in order to dig into the sealing face 2c, is formed so as to engage on the outer end face of the convex orifice base 2 of the gasket type orifice 1 so as to provided a seal, thereby sealing it. The annular protrusion 7d is formed on a bottom face of a portion of the body 7 provided with the smaller inner diameter of the orifice storage recess 7c, and an annular protrusion 7e, which closely contacts sealing face 3d in order to dig into the sealing face 3d, is formed on the inner end face of the concave orifice base 3 of the gasket type orifice 1 so as to provide another seal in order to seal it. The annular protrusion 7e is formed on the bottom face of a portion of the body 7 provided with the larger inner diameter of the orifice storage recess 7c.

On the other hand, as shown in FIG. 4, the orifice storage recess 10b is formed in the upstream side end face of outlet side block 10 so as to be an annular recess surrounding the inlet side of the outlet side fluid passage 10a formed in the outlet side block 10. An annular gasket pressing protruding portion 10c, which is inserted into the circular recess 3e formed in the concave orifice base 3, is formed on the bottom face of the orifice storage recess 10b. An annular protrusion 10d, which closely contacts the sealing face 3C in order to dig into the sealing face 3c formed on the outer end face of the concave orifice base 3 of the gasket type orifice 1 so as to provide a seal thereby sealing it, is formed on the end face of the gasket pressing protruding portion 10c. Furthermore, when the gasket pressing protruding portion 10c is inserted into the recess 3e of the concave orifice base 3, it is possible to easily perform positioning of the gasket type orifice 1.

In addition, in the gasket type orifice 1 of this embodiment, a first distance is provided between the sealing face 2c, formed on the outer end face of the convex orifice base 2, and the sealing face 3c, formed on the outer end face of the concave orifice base 3, a second distance is provided between the sealing face 2c, formed on the outer end face of the convex orifice base 2, and the sealing face 3d, formed on the inner end face of the concave orifice base 3, a third distance is provided between the sealing face 3c, formed on the outer end face, and the sealing face 3d, formed on the inner end face of the concave orifice base 3. The gasket type orifice 1 is also provided with a first depth of the bottom face on the side with a smaller inner diameter and a second depth of the bottom face on the side with a larger inner diameter of the orifice storage recess 7c formed in the downstream side end face of the body 7, and a first height of the gasket pressing protruding portion 10c formed on the bottom face of the orifice storage recess 10b in the outlet side block 10. The first distance, the second distance, the third distance, the first depth, the second depth, and the first height are respectively configured so that, when the gasket type orifice 1 is accommodated in the orifice storage recesses 7c and 10b in the body 7 and the outlet side block 10, respectively, and the body 7 and the outlet side block 10 are fastened so as to be fixed with the bolts, as shown in FIG. 4, after the A plane first comes into contact to form a seal, the B plane comes into contact to form a seal, and leak rates from the A plane sealing face (also referred to as the "A plane seal") and the sealing part of the orifice plate 4 are less than or equal to $1\times10^{-4}$ Pa·m$^3$/sec, and leak rates from the B plane sealing faces (also referred to as the "B plane seal") and the C plane sealing faces (also referred to as the "C plane seal") leading to external leaks are less than or equal to $1\times10^{-10}$ Pa·m$^3$/sec. However, leak rates from the A plane seal and the sealing part of the orifice plate 4, and from the B plane seal and the C plane seal are not limited to these values. Leaks from some sealing planes may be less strictly considered, and it may be acceptable not to completely prevent leaks in some cases and still fall within the scope of the present invention. However, in accordance with a preferred embodiment of the present invention, the leak rates for the A plane seal, the B plane seal, and the C plane seal are exhibited in accordance with the minimal leak rates obtained above.

The gasket type orifice 1 embodiment described above is configured so that the outer end face of the convex orifice base 2, the outer end face of the concave orifice base 3, and the inner end face of the concave orifice base 3, respectively, serve as the sealing faces 2c, 3c, and 3d, so that the gasket type orifice 1 can be tightly fastened and fixed to the fluid passage, and additionally, there are three sealing areas, namely, the A plane seal, the B plane seal and the C plane seal, that lead to an extremely superior sealing performance. Furthermore, because the gasket type orifice 1, according to an embodiment of the present invention, is configured so that the outer peripheral edge portion of the inner end face of the concave orifice base 3 serves as the sealing face 3d, the sealing part of the orifice plate 4 is located medially with respect to the sealing face 3d formed on the outer peripheral edge portion of the inner end face of the concave orifice base 3. In this context, the sealing part of the orifice plate 4 is medial to the sealing face 3d in that the sealing part of the orifice plate 4 is disposed closer to the central axis of passages 2a and 3a, as evident from FIG. 4, than the annular sealing face 3d, which is located at a farther distance (greater radius) from the central axis of passages 2a and 3a than the orifice plate 4. This structural relationship between the sealing face 3d and the sealing part of the orifice plate 4 makes it possible to completely prevent external leaks from the sealing part of the orifice plate 4. As a result, in accordance with this embodiment of the gasket type orifice 1, the sealing part of the orifice plate 4 may be set to be measurably slack (i.e., prone to some higher degree of leakage). However, in this case, it is necessary to permit only a leak rate from the sealing part of the orifice plate 4 that has no effect on flow rate control. Moreover, because the pressure type flow rate control apparatus described above uses the gasket type orifice 1, the orifice 1 itself can be made highly accurately, and it is possible to secure airtightness and to securely prevent a deformation of the orifice plate 4 and/or the gasket type orifice 1 when mounting the orifice 1 to perform highly accurate flow rate control.

FIGS. 5 to 8 show the gasket type orifice 1, according to another embodiment of the present invention, and a pressure type flow rate control apparatus in which this gasket type orifice 1 embodiment is employed.

Figure 5:
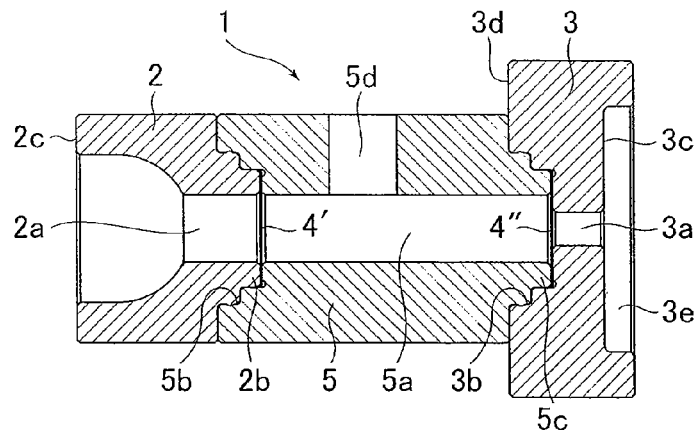
FIG. 5 is an enlarged longitudinal sectional view of a gasket type orifice, in an assembled state, according to another embodiment of the present invention.
Figure 6:
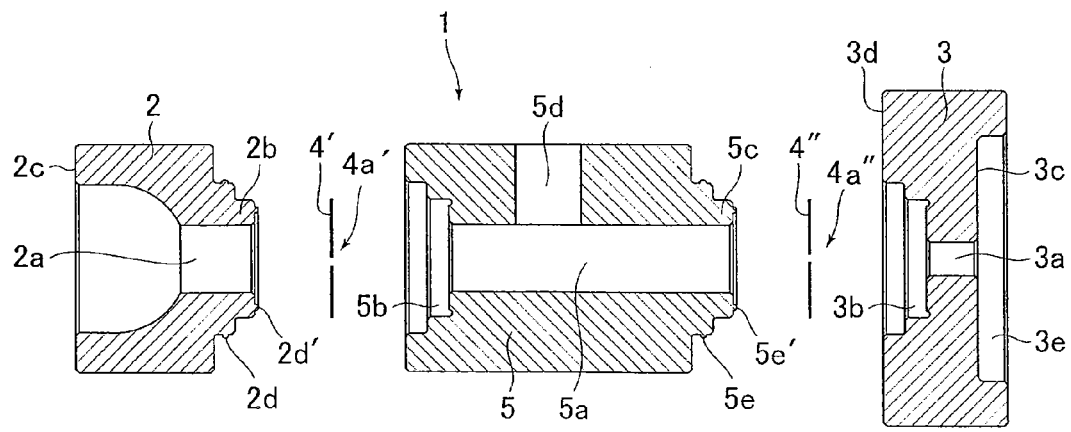
FIG. 6 is an enlarged longitudinal sectional view of the gasket type orifice shown in FIG. 5, which is shown in a disassembled state.

As shown in FIGS. 5 and 6, the gasket type orifice 1 of the additional embodiment includes (i) the convex orifice base 2, which has the through-type passage 2a formed in the central area thereof, and the convex orifice base 2 includes the fitting protruding portion 2b disposed on the inner end face thereof, (ii) the concave orifice base 3, which has the through-type passage 3a formed in the central area thereof and the concave orifice base 3 includes the fitting concave portion 3b formed in the inner end face thereof, (iii) a middle orifice base 5, which has a through-type passage 5a formed in the central area thereof and the middle orifice base includes a fitting concave portion 5b formed in one end face thereof, and includes a fitting protruding portion 5c disposed on the other end face thereof, and (iv) two orifice plates, namely, a low flow rate orifice plate 4' and a high flow rate orifice plate 4", each having respective orifice holes 4a' and 4a" (not illustrated in any more detail than in FIG. 6) formed in the central areas thereof. In this gasket type orifice 1 embodiment, the convex orifice base 2, the middle orifice base 5, and the concave orifice base 3 are combined to mount the orifice plates 4' and 4" by insertion, in an airtight manner, respectively, between the convex orifice base 2 and the middle orifice base 5 and between the concave orifice base 3 and the middle orifice base 5, so that the outer end faces of both the convex orifice base 2 and the concave orifice base 3 and the inner end face of the concave orifice base 3, respectively, serve as sealing faces 2c, 3c, and 3d, so that the gasket type orifice 1 is capable of preventing external leaks from the sealing parts of the both orifice plates 4' and 4". Furthermore, the gasket type orifice 1 is configured so that a flow dividing passage 5d formed in the middle orifice base 5 divergingly communicates with the passage 5a of the middle orifice base 5, and the low flow rate orifice plate 4' is mounted by insertion, in an airtight manner, between the convex orifice base 2 and the middle orifice base 5, and the high flow rate orifice plate 4" is mounted by insertion between the concave orifice base 3 and the middle orifice base 5, so that space-saving (compactness) of the gasket type orifice 1 may be achieved.

In more detail, as shown in FIG. 6, the convex orifice base 2 is formed into a convex short cylinder shape, as a cross-sectional shape from a stainless steel material (SUS316L-P (W melt)), and the through-type passage 2a, whose inner peripheral face is formed to be stepped, is formed in the central area of the convex orifice base 2. Furthermore, the tubular fitting protruding portion 2b, whose outer peripheral face is formed to be stepped, is formed to protrude concentrically with the passage 2a on the inner end face of the convex orifice base 2 (i.e., the end face facing the middle orifice base 5). The annular protrusions 2d and 2d', which fulfill their sealing functions when they are assembled with the middle orifice base 5, are respectively formed on the outer peripheral face on the large-diameter side of the fitting protruding portion 2b and on the end face of the fitting protruding portion 2b. Moreover, the convex orifice base 2 is configured to make the outer end face, which is formed to be annular shaped, as the sealing face 2c of the gasket type orifice 1.

As shown in FIG. 6, the concave orifice base 3 is formed into a concave thick-walled disc shape, as a cross-sectional shape from a stainless steel material (SUS316L-P (W melt)), and the through-type passage 3a is formed in the central area of the concave orifice base 3. Furthermore, the fitting concave portion 3b into which the fitting protruding portion 5c of the middle orifice base 5 is fitted, in an airtight manner, is formed concentrically with the passage 3a in the inner end face of the concave orifice base 3 (i.e., the end face facing the middle orifice base 5). The inner peripheral face of the fitting concave portion 3b is formed into a stepped inner peripheral face so that the fitting protruding portion 5c of the middle orifice base 5 fits into the fitting concave portion 3b in an airtight manner. Moreover, the circular recess 3e is formed concentrically with the passage 3a in the outer end face of the concave orifice base 3, and the bottom face of the recess 3e, formed in the outer end face of the concave orifice base 3, functions as the sealing face 3c of the gasket type orifice 1. The recess 3e facilitates positioning (alignment) of the gasket type orifice 1 and protects the sealing face 3c.

As shown in FIG. 6, the middle orifice base 5 is formed into a cylinder shape with a maximum diameter that is the same as the maximum outer diameter of the convex orifice base 2, which is constructed from a stainless steel material (SUS316L-P (W melt)), and the through-type passage 5a, which communicates with the passage 2a of the convex orifice base 2 and with the passage 3a of the concave orifice base 3 when the gasket type orifice 1 is assembled, is formed in the central area of the middle orifice base 5. Furthermore, the fitting concave portion 5b, into which the fitting protruding portion 2b of the convex orifice base 2 fits in an airtight manner, is formed concentrically with the passage 5a on the one end face of the middle orifice base 5 (i.e., the end face facing the convex orifice base 2). The inner peripheral face of the fitting concave portion 5b is formed into a stepped inner peripheral face so that the fitting protruding portion 2b of the convex orifice base 2 fits into the fitting concave portion 5b in an airtight manner. Moreover, the tubular fitting protruding portion 5c, whose outer peripheral face is formed to be stepped, and which fits in an airtight manner into the fitting concave portion 3b of the concave orifice base 3, is formed concentrically with the passage 5a on the other end face of the middle orifice base 5 (i.e., the end face facing the concave orifice base 3). Annular protrusions 5e and 5e', which fulfill their sealing functions when they are assembled with the concave orifice base 3, are respectively formed on the outer peripheral face on the large-diameter side of the fitting protruding portion 5c and on the end face of the fitting protruding portion 5c. In addition, a flow dividing passage 5d, which divergingly communicates with the passage 5a of the middle orifice base 5, is formed in the peripheral wall portion of the middle orifice base 5.

Then, at the boundary between the convex orifice base 5 and the concave orifice base 3, the orifice base 3, which is located on the downstream side, is formed to have an outer diameter that is larger than the outer diameter of the orifice base 5 (and of orifice base 2), which is located on the upstream side, and the outer peripheral edge portion of the inner end face of the orifice base 3 located on the downstream side functions as the sealing face 3d of the gasket type orifice 1. In this embodiment, the outer diameter of the concave orifice base 3, which is located on the downstream side, is formed larger than the outer diameters of the convex orifice base 2 and of the middle orifice base 5 located on the upstream side, and the outer peripheral edge portion of the inner end face of the concave orifice base 3 serves as the sealing face 3d of the gasket type orifice 1.

The low flow rate and high flow rate orifice plates 4' and 4", respectively, are formed into ultrathin plate shapes from stainless steel materials of the same quality as the respective orifice bases 2, 3, and 5, or of stainless steel materials (NK clean Z) containing extremely low impurities, and the orifice holes 4a' and 4a" (not illustrated in any more detail than in FIG. 6) are provided with desired inner diameters that communicate with the passages 2a, 3a and 5a of the respective orifice bases 2, 3, and 5. The orifice holes 4a' and 4a" of the orifice plates 4' and 4" are respectively formed in the central areas of the low flow rate plate 4' and the high flow rate orifice plate 4". The size of the low flow rate orifice plate 4' is set to be able to be accommodated in the small diameter portion of the fitting concave portion 5b of the middle orifice base 5. Furthermore, the size of the high flow rate orifice plate 4" is set to be able to be accommodated in the small diameter portion of the fitting concave portion 3b of the concave orifice base 3. In addition, the exterior shapes of both orifice plates 4' and 4" may be circular, or they may be another shape.

The gasket type orifice 1 of the embodiment of FIGS. 5 and 6 described above is configured so that the high flow rate orifice plate 4" and the low flow rate orifice plate 4' are, respectively, accommodated in the fitting concave portion 3b of the concave orifice base 3 and the fitting concave portion 5b of the middle orifice base 5, and the fitting protruding portion 2b of the convex orifice base 2 and the fitting protruding portion 5c of the middle orifice base 5 are, respectively, pressed into the fitting concave portion 5b of the middle orifice base 5 and the fitting concave portion 3b of the concave orifice base 3 at a thrust force of approximately 90N by a press machine (not illustrated) to integrate the respective orifice bases 2, 3, and 5 in an airtight manner. In this way, after the orifice bases 2, 3 and 5 have been press fitted together, the outer peripheral faces of the fitting protruding portions 2b and 5c of the convex orifice base 2 and the middle orifice base 5, respectively, closely contact the inner peripheral faces of the fitting concave portions 5b and 3b of the middle orifice base 5 and the concave orifice base 3 in an airtight manner. Thus, both faces of the respective orifice plates 4' and 4" closely contact the end faces of the respective fitting protruding portions 2b and 5c and of the bottom faces of the respective fitting concave portions 3b and 5b, so that the two orifice plates 4' and 4" are firmly mounted by insertion, in an airtight manner, between the respective orifice bases 2, 3 and 5. Furthermore, the annular protrusions 2d, 2d', 5e, and 5e' are, respectively, formed on the outer peripheral faces and the end faces of the respective fitting protruding portions 2b and 5c, so that the sealing performances are further secured.

In addition, the convex orifice base 2 and the concave orifice base 3 of the gasket type orifice 1, shown in the embodiment of FIGS. 5 and 6, are formed of the same shape and the same size as the convex orifice base 2 and the concave orifice base 3 of the gasket type orifice 1 shown in the embodiment of FIGS. 1 and 2. This feature brings about a commonality between the embodiments.

Figure 7:
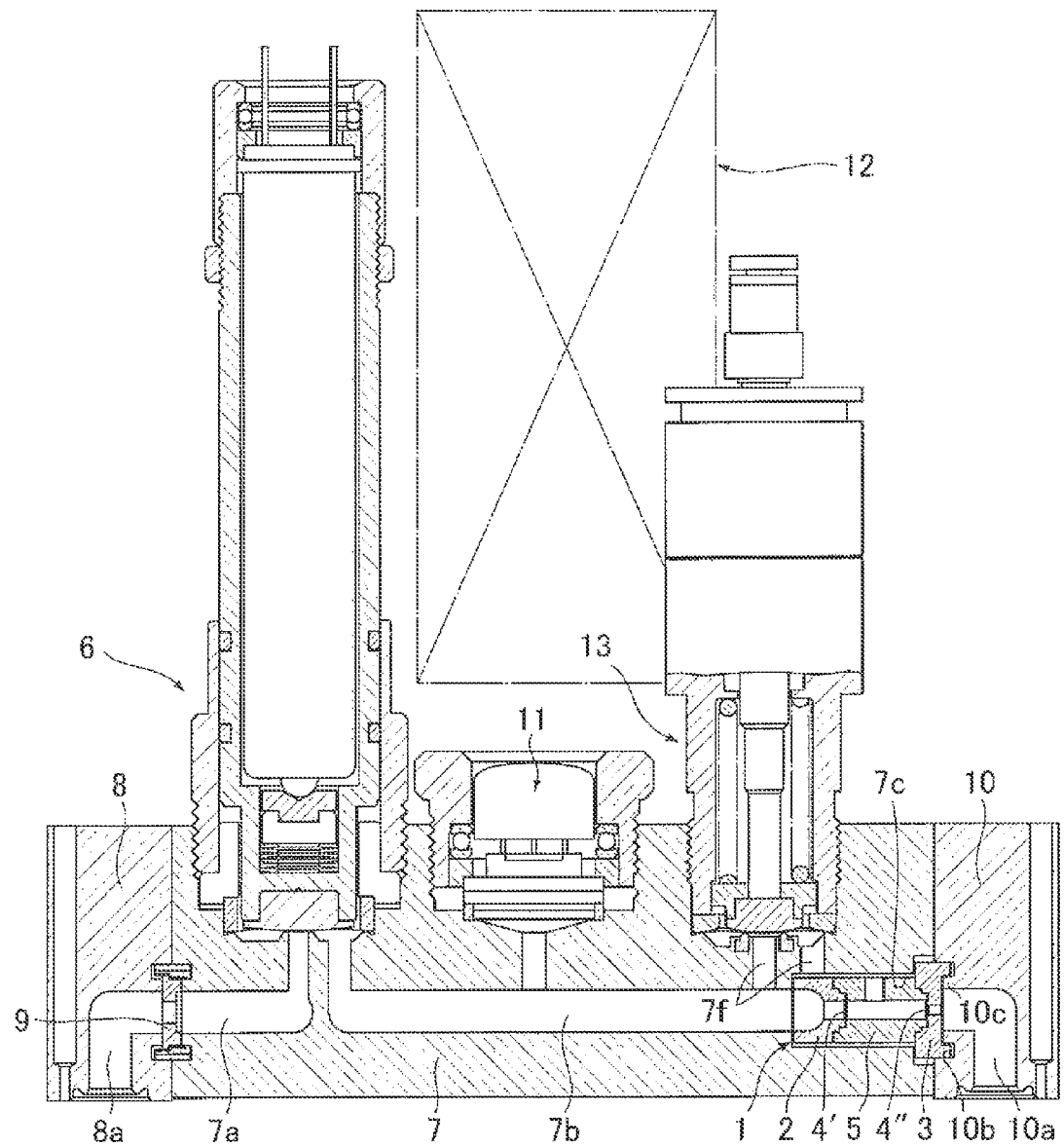
FIG. 7 is a longitudinal sectional view of a pressure type flow rate control apparatus in which the gasket type orifice shown in FIG. 5 is employed.

As shown in FIG. 7, the pressure type flow rate control apparatus, in which the gasket type orifice 1 embodiment of FIGS. 5 and 6 is employed, includes (A) the piezoelectric element-driven control valve 6, (B) a switching valve 13 that is installed in the body 7 of the control valve 6 (i.e., this body 7 serves both as a body of the control valve 6 and as a body of the switching valve 13), and is inserted in a flow dividing passage 7f, which diverges from the downstream side fluid passage 7b formed in the body 7, to flow into the fluid passage 7b again, (C) the inlet side block 8 having the inlet side fluid passage 8a disposed to communicate with the upstream side fluid passage 7a formed in the body 7, wherein the inlet side block 8 is fastened fixedly to the upstream side of the body 7 of the control valve 6 with a bolt (not illustrated), (D) the gasket type filter 9, which is inserted between the body 7 and the inlet side block 8 in order to provide a seal between both the body 7 and the inlet side block 8, (E) the outlet side block 10 having the outlet side fluid passage 10a formed in the outlet side block 10 so as to communicate with a junction point between the downstream side fluid passage 7b and the flow dividing passage 7f, which are formed in the body 7, wherein the outlet side block 10 is fastened fixedly to the downstream side of the body 7 of the control valve 6 with a bolt (not illustrated), (F) the gasket type orifice 1 for flow rate control of FIG. 5, which is located at the junction point between the downstream side fluid passage 7b and the flow dividing passage 7f, which are formed in the body 7, so that the gasket type orifice 1 is inserted between the body 7 and the outlet side block 10 in order to provide a seal between the body 7 and the outlet side block 10, (G) the pressure sensor 11, which is installed in the body 7 of the control valve 6 in order to detect pressure on the upstream side of the gasket type orifice 1 and (H) the control circuit 12 that is operably connected to control the control valve 6 and the switching valve 13. The pressure type flow rate control apparatus is configured to control an orifice passing flow rate by opening and closing the control valve 6 using pressure on the upstream side of the gasket type orifice 1, while calculating an orifice passing flow rate, and to perform flow rate control for a low flow rate fluid and to perform flow rate control for a high flow rate fluid by switching a fluid flow rate control range between a low flow rate region and a high flow rate region by turning on (activating) the switching valve 13.

In other words, in the case of performing flow rate control for a low flow rate fluid, the flow rate control is performed so that the switching valve 13 is switched to a closed state (i.e., the switching valve 13 is not activated) to cause the fluid to circulate to the outflow passage 10a of the outlet side block 10 through the downstream side fluid passage 7b in the body 7, through the passage 2a of the convex orifice base 2, through the low flow rate orifice plate 4', through the passage 5a of the middle orifice base 5, through the high flow rate orifice plate 4", and through the passage 3a of the concave orifice base 3, wherein the flow rate Q is controlled to be $Q = K_1 P_1$ (where $K_1$ is a constant specific to the low flow rate orifice, and $P_1$ is pressure on the upstream side of the gasket type orifice 1) by the low flow rate orifice plate 4'. In this case, the low flow rate orifice plate 4' is rate limiting.

Furthermore, in the case of performing flow rate control for a high flow rate fluid, the flow rate control is performed so that the switching valve 13 is switched from a closed state to an open state (i.e., the switching valve is activated) to cause the fluid to circulate to the high flow rate orifice plate 4" through the downstream side fluid passage 7b in the body 7, via the flow dividing passage 7f (i.e., a bypass) in the body 7, then through the flow dividing passage 5d of the middle orifice base 5, through the passage 5a of the middle orifice base 5, and then through the high flow-rate orifice plate 4", as well as allowing fluid to flow at the same time through the passage 2a of the convex orifice base 2, through the low flow rate orifice plate 4', through the passage 5a of the middle orifice base 5, through the high flow rate orifice plate 4", and then through the passage 3a of the concave orifice base 3, wherein the flow rate Q is controlled to be $Q=K_2P_1$ (where $K_2$ is a constant specified to the high flow rate orifice, and $P_1$ is pressure on the upstream side of the gasket type orifice 1) by the high flow rate orifice plate 4". In this case, the high flow rate orifice plate 4" is rate limiting even though fluid flows through the low flow rate orifice plate 4' as well.

Furthermore, the orifice storage recesses 7c and 10b, in which the gasket type orifice 1 is accommodated, are respectively formed at the junction point between the downstream side fluid passage 7b and the flow dividing passage 7f in the body 7 of the control valve 6. In other words, the orifice storage recesses 7c and 10b are formed in the downstream side end face of the body 7 and the upstream side end face of the outlet side block 10, respectively.

Figure 8:
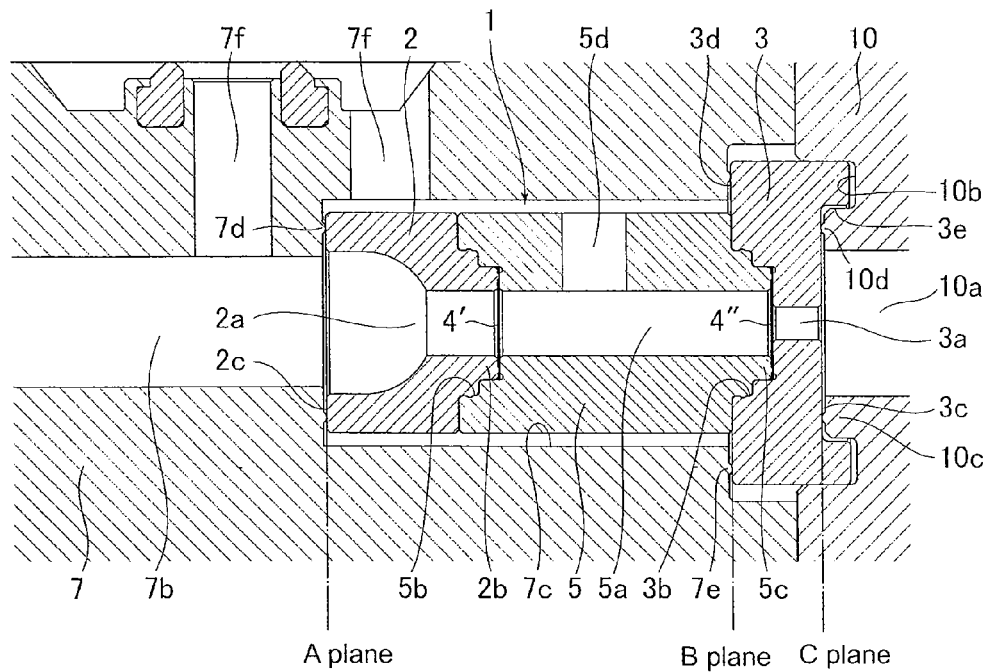
FIG. 8 is an enlarged longitudinal sectional view of a portion of the pressure type flow rate control apparatus of FIG. 7, which includes a gasket type orifice of FIG. 5.

In other words, the orifice storage recess 7c formed at the junction point between the fluid passage 7b and the flow dividing passage 7f in the body 7, which is in the downstream side end face of the body 7, is formed to be a stepped recess whose inner diameter changes along the way (i.e., increases in the downstream direction) as shown in FIG. 8. The annular protrusion 7d of the body 7, which closely contacts the sealing face 2c in order to dig into the sealing face 2c formed on the outer end face of the convex orifice base 2 of the gasket type orifice 1 so as to form a seal, is formed on the bottom face of a first portion of the orifice storage recess provided with the smaller inner diameter of the orifice storage recess 7c, and the annular protrusion 7e, which closely contacts the sealing face 3d in order to dig into the sealing face 3d formed on the inner end face of the concave orifice base 3 of the gasket type orifice 1 so as to form a seal, is formed on the bottom face of a second portion of the orifice storage recess 7c provided with the larger inner diameter. Furthermore, the orifice storage recess 7c is formed so that the smaller inner diameter is larger than the outer diameters of the convex orifice base 2 and of the middle orifice base 5 of the gasket type orifice 1. Consequently, when the gasket type orifice 1 is mounted by insertion into the orifice storage recess 7c, an annular space forms between the inner peripheral face of the orifice storage recess 7c and the surfaces of the convex orifice base 2 and the middle orifice base 5. By this construction, the flow dividing passage 7f formed in the body 7 and the flow dividing passage 5d of the middle orifice base 5 are able to communicate with one another through this annular space (See FIG. 8).

On the other hand, as also shown in FIG. 8, the orifice storage recess 10b formed in the upstream side end face of outlet side block 10 is formed as an annular recess surrounding the inlet side of the outlet side fluid passage 10a in the outlet side block 10. The annular gasket pressing protruding portion 10c, which is inserted into the circular recess 3e formed in the concave orifice base 3, is formed on the bottom face of the orifice storage recess 10b. The annular protrusion 10d, which closely contacts the sealing face 3c in order to dig into the sealing face 3c formed on the outer end face of the concave orifice base 3 of the gasket type orifice 1 so as to form a seal, is formed on the end face of the gasket pressing protruding portion 10c.

In addition, in the gasket type orifice 1 of this embodiment (FIG. 8), a first distance is provided between the sealing face 2c formed on the outer end face of the convex orifice base 2 and the sealing face 3c formed on the outer end face of the concave orifice base 3, a second distance is provided between the sealing face 2c formed on the outer end face of the convex orifice base 2 and the sealing face 3d formed on the inner end face of the concave orifice base 3, and a third distance is provided between the sealing face 3c formed on the outer end face of the concave orifice base 3 and the sealing face 3d formed on the inner end face of the concave orifice base 3. In addition, the gasket type orifice 1 is provided with a first depth of the bottom face on the side provided with a smaller inner diameter of the orifice storage recess 7c and a second depth of the bottom face on the side with a larger inner diameter of the orifice storage recess 7c formed on the downstream side end face of the body 7 and a first height of the gasket pressing protruding portion 10c formed on the bottom face of the orifice storage recess 10b in the outlet side block 10. The first distance, the second distance, the third distance, the first depth, the second depth, and the first height are, respectively, set so that when the gasket type orifice 1 is accommodated in the orifice storage recesses 7c and 10b in the body 7 and in the outlet side block 10, respectively, and the body 7 and the outlet side block 10 are fastened in a fixed manner with bolts, then, as shown in FIG. 8, after the A plane first comes into contact to form a seal, the B plane comes into contact to form another seal, and leak rates from the A plane and the sealing parts of the respective orifice plates 4' and 4" are less than or equal to $1\times10^{-4}$ Pa·m³/sec, and leak rates from the B plane and the C plane leading to external leaks are less than or equal to $1\times10^{-10}$ Pa·m³/sec. However, leak rates from the A plane and the sealing parts of the orifice plates 4' and 4", and from the B plane and the C plane, are not limited to these values, although they represent a preferred embodiment of the invention. Leaks from some sealing planes may be less strictly considered, and it may be acceptable to not completely prevent leaks in some cases, while still falling within the scope of the present invention.

The gasket type orifice 1, as described above with respect to FIG. 8, is configured so that the outer end face of the convex orifice base 2, the outer end face of the concave orifice base 3, and the inner end face of the concave orifice base 3, respectively, serve as the sealing faces 2c, 3c, and 3d, so that the gasket type orifice 1 can be tightly fastened in a fixed manner to the fluid passage. Additionally, this embodiment employs three sealing areas, which lead to an extremely superior sealing performance. Furthermore, because the gasket type orifice 1, in accordance with the present embodiment of FIG. 8 of the invention, is configured so that the outer peripheral edge portion of the inner end face of the concave orifice base 3 serves as the sealing face 3d, the sealing parts of the orifice plates 4' and 4" are located medially with respect to the sealing face 3d formed on the outer peripheral edge portion of the inner end face of the concave orifice base 3. In this context, the sealing parts of the orifice plates 4' and 4" are medial to the sealing face 3d in that the sealing parts of the orifice plates 4' and 4" are disposed closer to the central axis of passages 2a, 3a and 5a, as evident from FIG. 9, than the annular sealing face 3d, which is located at a farther distance (greater radius) from the central axis of passages 2a, 3a and 5a than the orifice plates 4' and 4". This structural relationship between the sealing face 3d and the sealing parts of the orifice plates 4' and 4" makes it possible to completely prevent external leaks from the sealing parts of the orifice plates 4' and 4". As a result, in accordance with such an embodiment of the gasket type orifice 1, the sealing parts of the orifice plates 4' and 4" may be set to be measurably slack (i.e., prone to some higher degree of leakage). However, in this case, it is necessary to permit leak rates from the sealing parts of the orifice plates 4' and 4" only to the extent that they have no effect on flow rate control. Moreover, the gasket type orifice 1, according to this embodiment of the present invention, is configured so that the middle orifice base 5 is inserted between the convex orifice base 2 and the concave orifice base 3, and the low flow rate and high flow rate orifice plates 4' and 4" are respectively mounted, by insertion in an airtight manner, between the convex orifice base 2 and the middle orifice base 5 and between the concave orifice base 3 and the middle orifice base 5. Furthermore, the diverged flow dividing passage 5d is formed in the middle orifice base 5 so that one gasket type orifice 1 is capable of having two different flow rate characteristics (i.e., a high flow rate characteristic and a low flow rate characteristic). As a result, it is possible to achieve space-saving compactness as compared with the case where two gasket type orifices 1 are employed in order to provide both the high flow rate characteristic and the low flow rate characteristic. In addition, because the above-described pressure type flow rate control apparatus embodiment is provided with the gasket type orifice 1, which includes the low flow rate orifice plate 4' and the high flow rate orifice plate 4", and the switching valve 13 to switch a flow of fluid, the pressure type flow rate control apparatus is capable of performing flow rate control in which flow rate control by the low flow rate orifice plate 4', and flow rate control by the high flow rate orifice plate 4", are appropriately combined to perform highly accurate flow rate control over a broad range of flow rate regions even though only one pressure type flow rate control apparatus is used.

Figure 9:
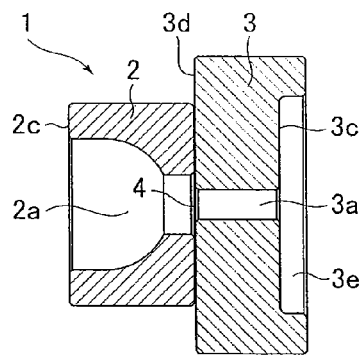
FIG. 9 is an enlarged longitudinal sectional view of a gasket type orifice, in an assembled state, according to yet another embodiment of the present invention.
Figure 10:
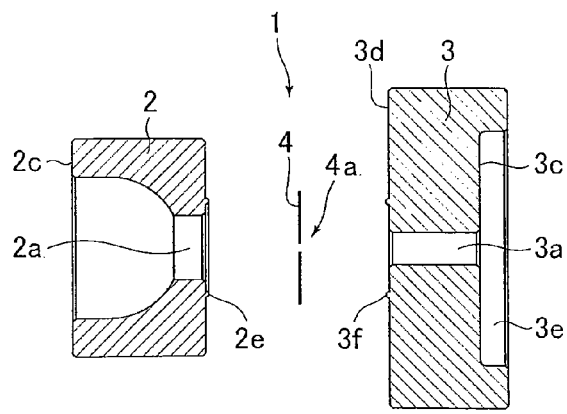
FIG. 10 is an enlarged longitudinal sectional view of the gasket type orifice shown in FIG. 9, which is shown in a disassembled state.
Figure 11:
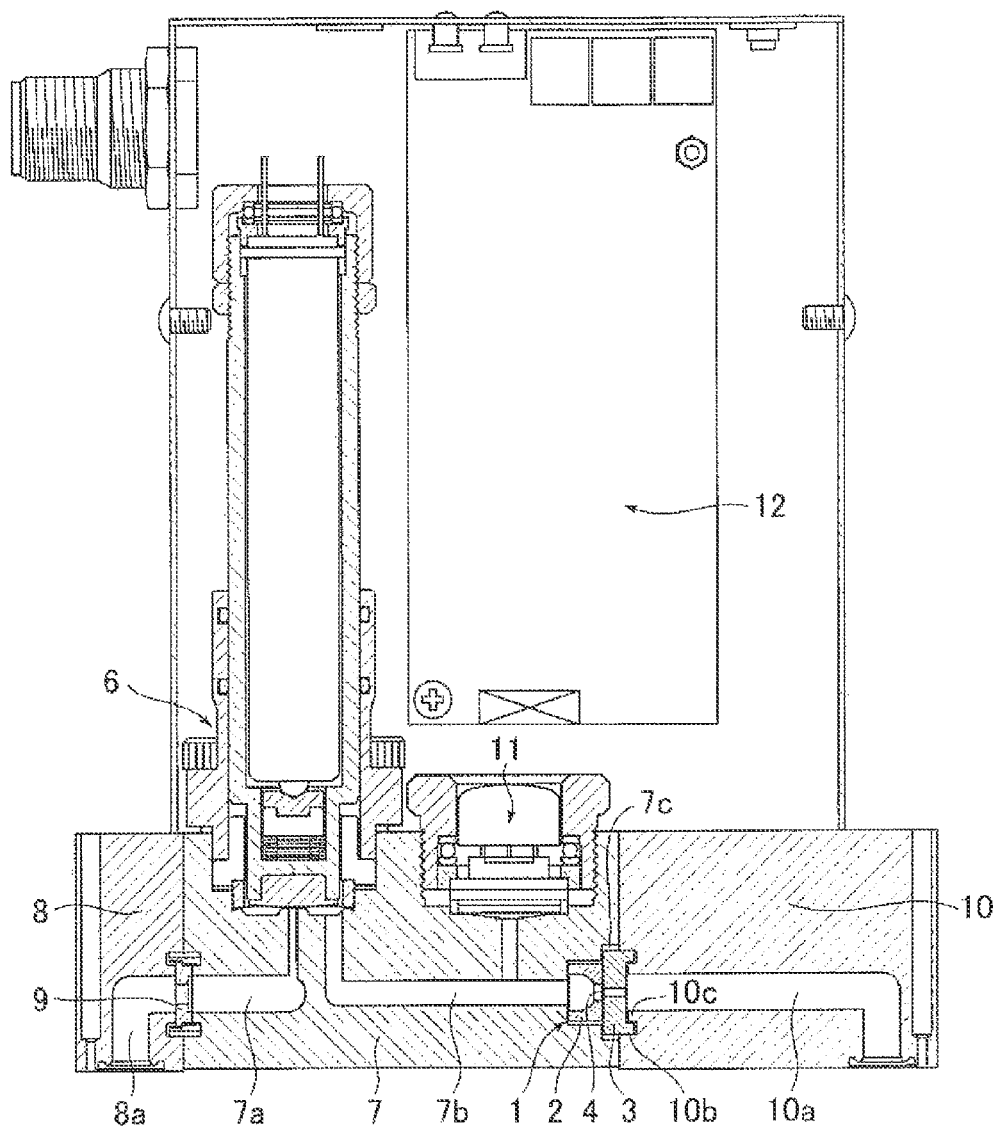
FIG. 11 is a longitudinal sectional view of a pressure type flow rate control apparatus in which the gasket type orifice shown in FIG. 9 is employed.

FIGS. 9 to 11 show a gasket type orifice 1 according to yet another embodiment of the present invention, and a pressure type flow rate control apparatus in which the gasket type orifice 1 embodiment of FIGS. 9 and 10 is employed.

As shown in FIG. 9, the gasket type orifice 1 includes (i) the upstream side orifice base 2, which has the through-type passage 2a formed in the central area thereof and whose inner end face is formed to be planar, (ii) the downstream side orifice base 3, which has a through-type passage 3a formed in the central area thereof and whose inner end face is formed to be planar, and which is formed to have a diameter larger than that of the orifice base 2, and (iv) the orifice plate 4 having an orifice hole 4a (not illustrated in any more detail than shown in FIG. 10) formed in the central area thereof, and the orifice plate 4 is held in an airtight manner between the planar inner end faces of the both orifice bases 2 and 3, and both outer end faces of both orifice bases 2 and 3, and the outer peripheral edge portion of the inner end face of the downstream side orifice base 3, serve as the sealing faces 2c, 3c, and 3d, respectively, so that the gasket type orifice 1 is capable of preventing an external leak from the sealing part of the orifice plate 4. Furthermore, as shown in FIG. 10, annular protrusions 2e and 3f, which fulfill their sealing functions when holding the orifice plate 4 between the inner end faces of the two orifice bases 2 and 3, are respectively formed on the inner end face of the upstream side orifice base 2 and on the inner end face of the downstream side orifice base 3.

In addition, the gasket type orifice 1 embodiment, shown in FIGS. 9 and 10, is formed with the same basic structure as the gasket type orifice 1 shown in FIGS. 1 and 2, except that the fitting protruding portion 2b and the fitting concave portion 3b of the two orifice bases 2 and 3 are omitted, because the inner end faces of the orifice bases 2 and 3 are respectively formed to be planar, and the annular protrusions 2e and 3f are formed on the planar inner end faces of the orifice bases 2 and 3. Structures and portions that are the same as those of the gasket type orifice 1, shown in FIGS. 1 and 2, are denoted by the same reference numerals, so detailed descriptions of these like components will be omitted.

As shown in FIG. 11, the pressure type flow rate control apparatus, in which the gasket type orifice 1 of FIG. 9 is employed, includes (A) the piezoelectric element-driven control valve 6, (B) the inlet side block 8, (C) the gasket type filter 9, (D) the outlet side block 10, (E) the gasket type orifice 1 for flow rate control (i.e., the gasket type orifice 1 shown in FIG. 9), (F) the pressure sensor 11, and (G) the control circuit 12. The pressure type flow rate control apparatus of FIG. 11 is configured to control an orifice passing flow rate by opening and closing the control valve 6 using pressure on the upstream side of the gasket type orifice 1 while calculating an orifice passing flow rate.

The pressure type flow rate control apparatus of FIG. 11 is configured with the same structure as the pressure type flow rate control apparatus shown in FIG. 3, except that the gasket type orifice 1 of FIG. 1 is replaced with the gasket type orifice 1 shown in FIG. 9. Portions and structures that are the same as those of the pressure type flow rate control apparatus shown in FIG. 3 are denoted by the same reference numerals, and detailed descriptions of these like components will be omitted.

The gasket type orifice 1 embodiment shown in FIG. 9, and the pressure type flow rate control apparatus shown in FIG. 11 as well, are capable of providing advantageous effects that are the same as those provided by the gasket type orifice 1 shown in FIG. 1 and the pressure type flow rate control apparatus shown in FIG. 3.

Figure 12:
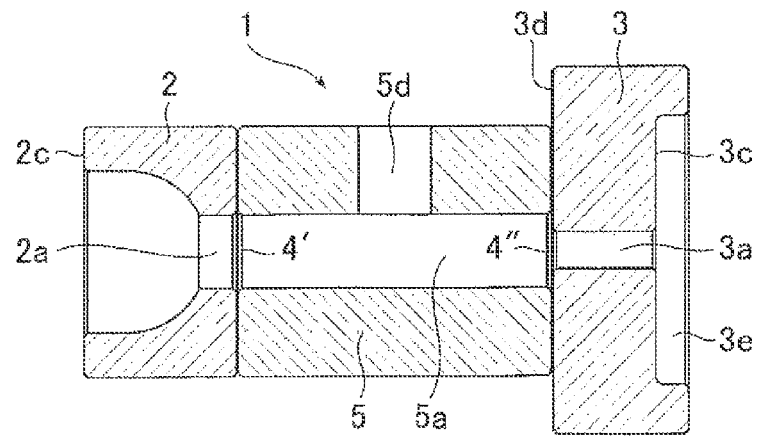
FIG. 12 is an enlarged longitudinal sectional view of a gasket type orifice, in an assembled state, according to yet another embodiment of the present invention.
Figure 13:
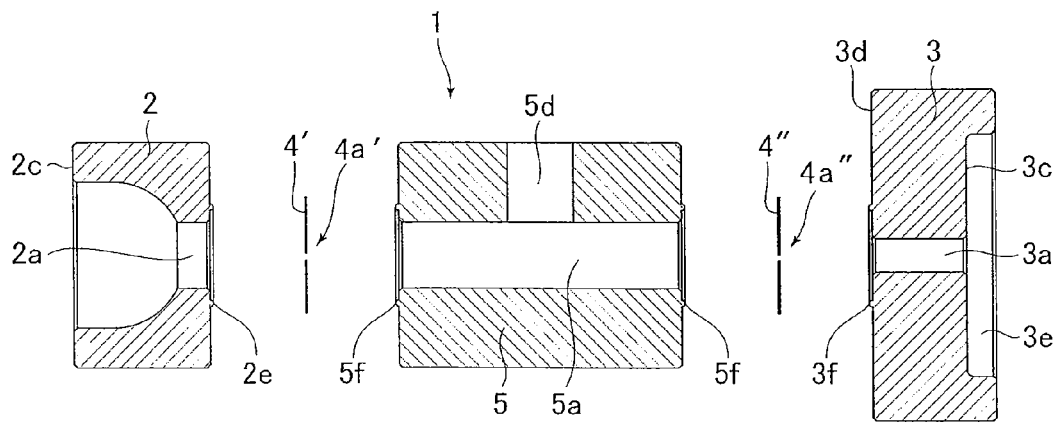
FIG. 13 is an enlarged longitudinal sectional view of the gasket type orifice shown in FIG. 12, which is shown in a disassembled state.
Figure 14:
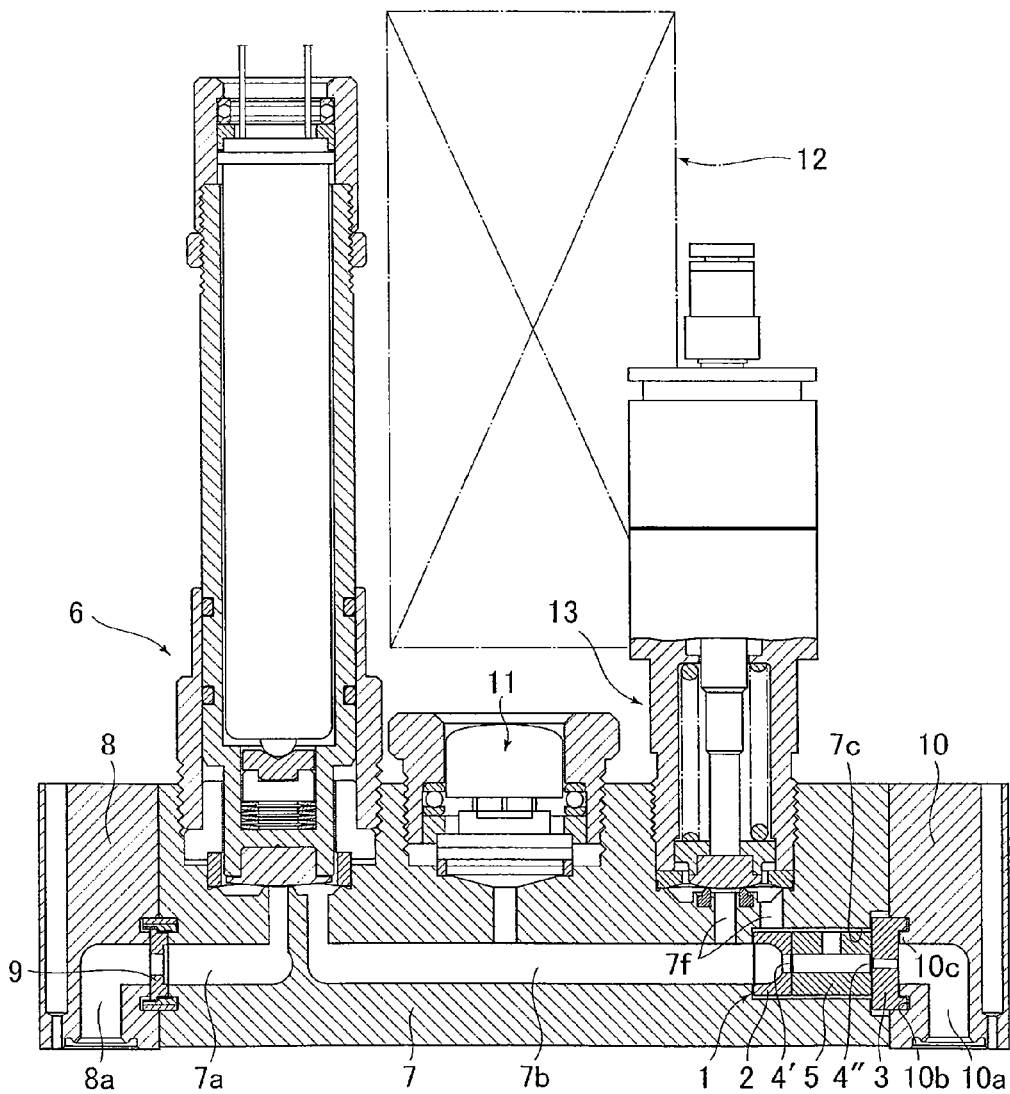
FIG. 14 is a longitudinal sectional view of a pressure type flow rate control apparatus in which the gasket type orifice shown in FIG. 12 is employed.

FIGS. 12 to 14 show a gasket type orifice 1 according to yet another embodiment of the present invention, and a pressure type flow rate control apparatus in which this gasket type orifice 1 of FIGS. 12 and 13 is employed.

As shown in FIG. 12, the gasket type orifice 1 includes (i) the upstream side orifice base 2, which has a through-type passage 2a formed in the central area thereof, and whose inner end face is formed to be planar, (ii) the downstream side orifice base 3, which has the through-type passage 3a formed in the central area thereof, and whose inner end face is formed to be planar, and wherein the downstream side orifice base 3 is formed to have a diameter larger than that of the orifice base 2, (iii) the middle orifice base 5, which has the through-type passage 5a formed in the central area thereof and whose two end faces are formed to be planar, and wherein the middle orifice base 5 has an outer diameter that is the same as that of the upstream side orifice base 2, and (iv) two orifice plates, namely, a low flow rate orifice plate 4' and a high flow rate orifice plate 4", which have orifice holes 4a' and 4a" (not illustrated in any more detail than in FIG. 13) formed in the central areas thereof, wherein the low flow rate orifice plate 4' is located on the upstream side and is held in an airtight manner between the inner end face of the upstream side orifice base 2 and one end face of the middle orifice base 5, and wherein the high flow rate orifice plate 4" is located on the downstream side and is held in an airtight manner between the inner end face of the downstream side orifice base 3 and the other end face of the middle orifice base 5. In this embodiment, the outer end faces of both orifice bases 2 and 3, and the outer peripheral edge portion of the inner end face of the downstream side orifice base 3, respectively, serve as the sealing faces 2c, 3c, and 3d, so that the gasket type orifice 1 is capable of preventing an external leak from the sealing parts of both orifice plates 4' and 4". Furthermore, the gasket type orifice 1 of this embodiment is configured so that the flow dividing passage 5d, formed in the middle orifice base 5, divergingly communicates with the passage 5a of the middle orifice base 5. Moreover, as shown in FIG. 13, annular protrusions 2e, 3f, and 5f, which fulfill their sealing functions when holding the respective orifice plates 4' and 4" between the respective orifice bases 2, 3, and 5, are respectively formed on the inner end face of the upstream side orifice base 2, the inner end face of the downstream side orifice base 3, and both end faces of the middle orifice base 5.

In addition, the gasket type orifice 1 embodiment, shown in FIGS. 12 and 13, is formed with the same basic structure as the gasket type orifice 1 shown in FIGS. 5 and 6, except that the fitting protruding portions 2b and 5c, and the fitting concave portions 3b and 5b of the respective orifice bases 2, 3, and 5 are omitted, and the inner end faces of both orifice bases 2 and 3 and both end faces of the middle orifice base 5 are, respectively, formed to be planar, and the annular protrusions 2e, 3f, and 5f are formed on the planar inner end faces of both orifice bases 2 and 3 and on both planar end faces of the middle orifice base 5. Members and structures that are the same as those of the gasket type orifice 1 embodiment shown in FIGS. 5 and 6 are denoted by the same reference numerals, and detailed descriptions of like components will be omitted.

As shown in FIG. 14, the pressure type flow rate control apparatus in which the gasket type orifice 1 embodiment of FIG. 13 is employed, includes (A) the piezoelectric element-driven control valve 6, (B) the switching valve 13, (C) the inlet side block 8, (D) the gasket type filter 9, (E) the outlet side block 10, (F) the gasket type orifice 1 for flow rate control (i.e., the gasket type orifice 1 shown in FIG. 12), (G) the pressure sensor 11, and (H) the control circuit 12. The pressure type flow rate control apparatus, according to FIG. 14, is configured to control an orifice passing flow rate by opening and closing the control valve 6 using pressure on the upstream side of the gasket type orifice 1 while calculating an orifice passing flow rate, and to perform flow rate control for a low flow rate fluid and flow rate control for a high flow rate fluid by switching the fluid flow rate control range between a low flow rate region and a high flow rate region by activating the switching valve 13.

The pressure type flow rate control apparatus of FIG. 14 is configured with the same basic structure as the pressure type flow rate control apparatus shown in FIG. 7, except that the gasket type orifice 1 of FIG. 5 is replaced with the gasket type orifice 1 shown in FIG. 12. Portions and structures that are the same as those of the pressure type flow rate control apparatus shown in FIG. 7 are denoted by the same reference numerals, and detailed descriptions of like components will be omitted.

The gasket type orifice 1 shown in FIG. 12, and the pressure type flow rate control apparatus shown in FIG. 14 as well, are capable of providing advantageous effects that are the same as those of the gasket type orifice 1 shown in FIG. 5 and of the pressure type flow rate control apparatus shown in FIG. 7.

Figure 15:
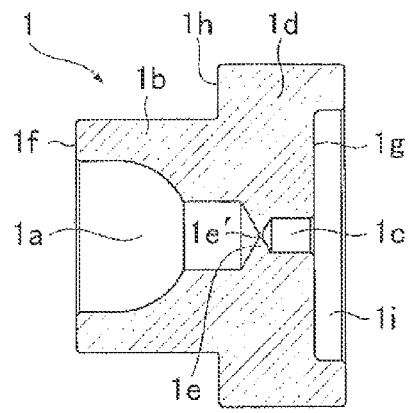
FIG. 15 is an enlarged longitudinal sectional view of a gasket type orifice, according to yet another embodiment of the present invention, in which an upstream side orifice base and a downstream side orifice base are integrated.

FIG. 15 shows a gasket type orifice 1 according to yet another embodiment of the present invention. The gasket type orifice 1 of FIG. 15 is configured so that an upstream side orifice base 1b and a downstream side orifice base 1d are integrally formed from one member by cutting work. An orifice part 1e is provided between the upstream side orifice base 1b and the downstream side orifice base 1d, wherein the orifice part 1e is formed so as to open a hole therein by cutting work using a drill or the like.

In other words, the gasket type orifice 1 shown in FIG. 15 includes (i) the upstream side orifice base 1b having the passage 1a formed in the central area thereof, (ii) the downstream side orifice base 1d having a passage 1c formed in the central area thereof, which is installed to be connected to the upstream side orifice base 1b, wherein the downstream side orifice base 1d is formed to have a diameter larger than the diameter of the orifice base 1b, and (iii) the bulkhead type orifice part 1e having an orifice hole 1e' formed in the central area thereof, which serves to communicate the passages 1a and 1c of the orifice bases 1b and 1d with one another. The bulkhead type orifice part 1e is formed between the passages 1a and 1c, and the outer end faces of both orifice bases 1b and 1d, and the outer peripheral edge portion of the inner end face of the downstream side orifice base 1d, respectively, serve as sealing faces 1f, 1g, and 1h. Furthermore, a circular recess 1i is formed concentrically with the passage 1c in the outer end face of the downstream side orifice base 1d, and the bottom face of the recess 1i formed in the outer end face of the orifice base 1d functions as a sealing face 1g of the gasket type orifice 1.

The gasket type orifice 1, shown in FIG. 15, is also capable of providing advantageous effects that are the same as those of the gasket type orifice 1 shown in FIG. 1. In addition, because the upstream side orifice base 1b, the downstream side orifice base 1d, and the orifice part 1e are integrated in this gasket type orifice 1 embodiment, there is no external leak from the orifice part 1e.

Figure 16:
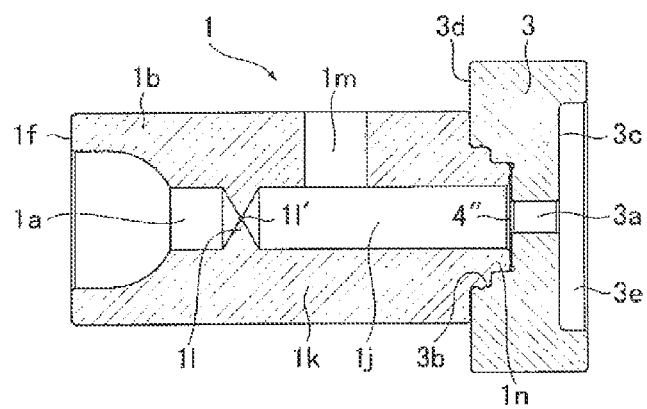
FIG. 16 is an enlarged longitudinal sectional view of a gasket type orifice, according to yet another embodiment of the present invention, in which an upstream side orifice base and a middle orifice base are integrated.

FIG. 16 shows a gasket type orifice 1 according to yet another embodiment of the present invention. The gasket type orifice 1 of FIG. 16 is configured so that the upstream side orifice base 1b and a middle orifice base 1k are integrally formed from one member by cutting work. An orifice part 1l is provided between the upstream side orifice base 1b and the middle orifice base 1k, wherein the orifice part 1l is formed so as to open a hole therein by cutting work using a drill, or the like.

In other words, the gasket type orifice 1 shown in FIG. 16 includes (i) the upstream side orifice base 1b having the passage 1a formed in the central area thereof, (ii) the middle orifice base 1k having a passage 1j formed in the central area thereof, wherein the middle orifice base 1k is installed to be integrally connected to the upstream side orifice base 1b, (iii) the downstream side orifice base 3, which has formed in a central area thereof a through-type passage 3a communicating with the passage 1j of the middle orifice base 1k, wherein the through-type passage 3a faces the middle orifice base 1k, (iv) the bulkhead type orifice part 1l having an orifice hole 1l' formed in the central area thereof, wherein the orifice hole 1l' makes the passage 1a of the orifice base 1b and the passage 1j of the middle orifice base 1k communicate with one another, wherein the bulkhead type orifice part 1l is formed between the passages 1a and 1j, and (v) the orifice plate 4" having an orifice hole formed in the central area thereof, wherein the orifice plate 4" is mounted by insertion, in an airtight manner, between the middle orifice base 1k and the downstream side orifice base 3. In this case, the outer end face of the upstream side orifice base 1b and the outer end face of the downstream side orifice base 3 respectively serve as the sealing faces 1f and 3c, respectively, wherein the outer diameter of the downstream side orifice base 3 is formed larger than the outer diameters of the upstream side orifice base 1b and the middle orifice base 1k. In addition, the outer peripheral edge portion of the inner end face of the downstream side orifice base 3 serves as the sealing face 3d, and a flow dividing passage 1m, formed in the middle orifice base 1k, divergingly communicates with the passage 1j of the middle orifice base 1k. Moreover, a tubular fitting protruding portion 1n, whose outer peripheral face is formed to be stepped, is formed to protrude concentrically with the passage 1*j* on the downstream side end face of the middle orifice base 1*k* and is fitted in an airtight manner into the fitting concave portion 3*b* of the downstream side orifice base 3. Annular protrusions (their symbols are omitted), fulfilling their sealing functions when assembled with the downstream side orifice base 3, are respectively formed on the outer peripheral face on the large-diameter side of the fitting protruding portion 1*n* and on the end face of the fitting protruding portion 1*n* (same structure as that of FIG. 6, annular protrusions 5*e* and 5*e*').

The gasket type orifice 1 shown in FIG. 16 is also capable of providing advantageous effects that are the same as those of the gasket type orifice 1 shown in FIG. 5. In addition, because the upstream side orifice base 1*b*, the middle orifice base 1*k*, and the upstream side orifice part 1*l* are integrated in the gasket type orifice 1 embodiment of FIG. 16, there is no external leak from the upstream side orifice part 1*l*.

Figure 17:
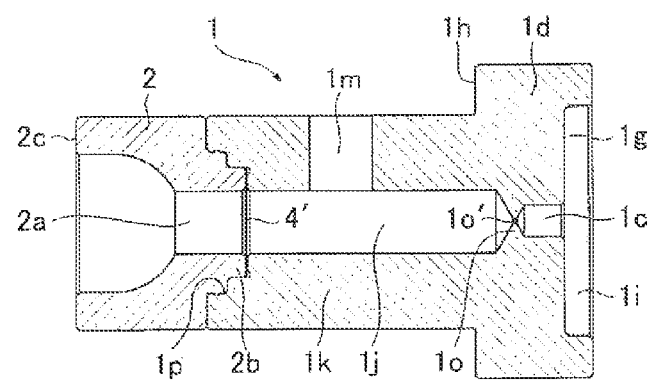
FIG. 17 is an enlarged longitudinal sectional view of a gasket type orifice, according to yet another embodiment of the present invention, in which a middle orifice base and a downstream side orifice base are integrated.

FIG. 17 shows a gasket type orifice 1 according to yet another embodiment of the present invention. The gasket type orifice 1 of FIG. 17 is configured so that the middle orifice base 1*k* and the downstream side orifice base 1*d* are integrally formed from one member by cutting work, and an orifice part 1*o* is provided between the middle orifice base 1*k* and the downstream side orifice base 1*d*. The orifice part 1*o* is formed so as to open a hole therein by cutting work using a drill, or the like.

That is, the gasket type orifice 1, shown in FIG. 17, includes (i) the upstream side orifice base 2 having the passage 2*a* formed in the central area thereof, (ii) the middle orifice base 1*k* having the passage 1*j* formed in the central area thereof, so that the passage 1*j* faces the upstream side orifice base 2, (iii) the downstream side orifice base 1*d* having the passage 1*c* formed in the central area thereof, wherein the downstream side orifice base 1*d* is installed to be integrally connected to the middle orifice base 1*k*, (iv) the orifice plate 4' having an orifice hole formed in the central area thereof, wherein the orifice plate 4' is mounted, by insertion in an airtight manner, between the upstream side orifice base 2 and the middle orifice base 1*k*, and (v) the bulkhead type orifice part 1*o* having an orifice hole 1*o*' formed in the central area thereof, wherein the orifice hole 1*o*' makes the passage 1*j* of the middle orifice base 1*k* and the passage 1*c* of the downstream side orifice base 1*d* communicate with one another. The bulkhead type orifice part 1*o* is formed between the passages 1*j* and 1*c*, and the outer end face of the upstream side orifice base 2 and the outer end face of the downstream side orifice base 1*d*, respectively, serve as the sealing faces 2*c* and 1*g*. Furthermore, the outer diameter of the downstream side orifice base 1*d* is formed larger than the outer diameters of the upstream side orifice base 2 and the middle orifice base 1*k*, and the outer peripheral edge portion of the inner end face of the downstream side orifice base 1*d* serves as a sealing face 1*h*, and the flow dividing passage 1*m* is formed in the middle orifice base 1*k* so as to divergingly communicate with the passage 1*j* of the middle orifice base 1*k*. Furthermore, a fitting concave portion 1*p*, into which the fitting protruding portion 2*b* of the upstream side orifice base 2 is fitted in an airtight manner, is formed concentrically with the passage 1*j* in the upstream side end face of the middle orifice base 1*k*. The inner peripheral face of the fitting concave portion 1*p* is formed into a stepped inner peripheral face so that the fitting protruding portion 2*b* of the convex orifice base 2 fits into the fitting concave portion 1*p* in an airtight manner. Moreover, the circular recess 1*i* is formed concentrically with the passage 1*c* in the outer end face of the downstream side orifice base 1*d*, and the bottom face of the recess 1*i*, formed in the outer end face of the orifice base 1*d*, functions as the sealing face 1*g* of the gasket type orifice 1.

The gasket type orifice 1 shown in FIG. 17 is also capable of providing advantageous effects that are the same as those of the gasket type orifice 1 shown in FIG. 5. In addition, because the middle orifice base 1*k*, the downstream side orifice base 1*d*, and the downstream side orifice part 1*o* are integrated in the gasket type orifice 1 embodiment of FIG. 17, there is no external leak from the downstream side orifice part 1*o*.

Figure 18:
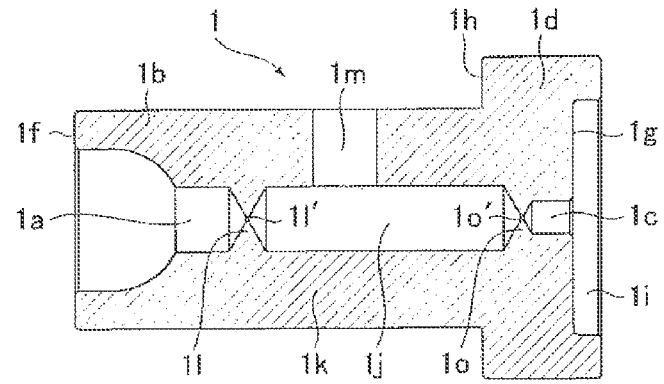
FIG. 18 is an enlarged longitudinal sectional view of a gasket type orifice, according to yet another embodiment of the present invention, in which an upstream side orifice base, a middle orifice base, and a downstream side orifice base are integrated.
Figure 19:
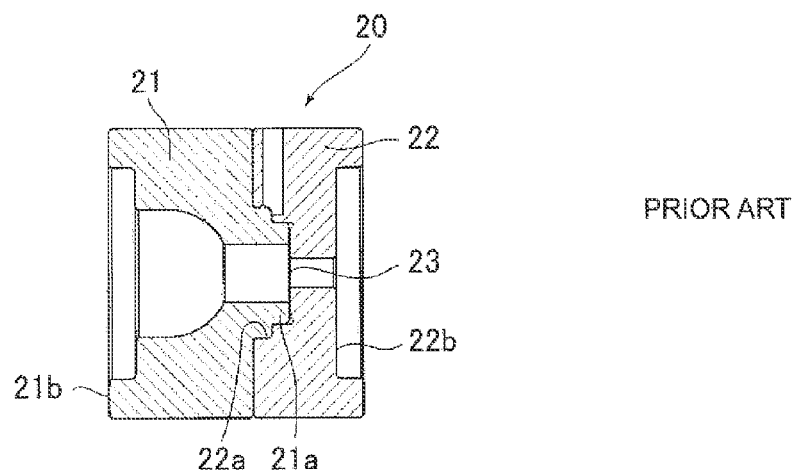
FIG. 19 is an enlarged longitudinal sectional view of a conventional gasket type orifice.

FIG. 18 shows a gasket type orifice 1 according to yet another embodiment of the present invention. The gasket type orifice 1 of FIG. 18 is configured so that the upstream side orifice base 1*b*, the middle orifice base 1*k*, and the downstream side orifice base 1*d*, are integrally formed from one member by cutting work, and the orifice part 1*l* is provided between the upstream side orifice base 1*b* and the middle orifice base 1*k*, and the orifice part 1*o* is provided between the middle orifice base 1*k* and the downstream side orifice base 1*d*, wherein each orifice part is formed so as to open a hole therein by cutting work using a drill, or the like.

In other words, the gasket type orifice 1 shown in FIG. 18 includes (A) the upstream side orifice base 1*b* having the passage 1*a* formed in the central area thereof, (B) the middle orifice base 1*k* having the passage 1*j* formed in the central area thereof, wherein the middle orifice base 1*k* is installed to be integrally connected to the upstream side orifice base 1*b*, (C) the downstream side orifice base 1*d* having the passage 1*c* formed in the central area thereof, wherein the downstream side orifice base 1*d* is installed to be integrally connected to the middle orifice base 1*k*, (D) the bulkhead type orifice part 1*l* having the orifice hole 1*l*' formed in the central area thereof, wherein the orifice hole 1*l*' makes the passage 1*a* of the upstream side orifice base 1*b* and the passage 1*j* of the middle orifice base 1*k* communicate with one another, wherein the bulkhead type orifice part 1*l* is formed between the passages 1*a* and 1*j*, and (E) the bulkhead type orifice part 1*o* having the orifice hole 1*o*' formed in the central area thereof, wherein the orifice hole 1*o*' makes the passage 1*j* of the middle orifice base 1*k* and the passage 1*c* of the downstream side orifice base 1*d* communicate with one another, wherein the bulkhead type orifice part 1*o* is formed between the passages 1*j* and 1*c*. Furthermore, the outer end face of the upstream side orifice base 1*b* and the outer end face of the downstream side orifice base 1*d*, respectively, serve as the sealing faces 1*f* and 1*g*, and the outer diameter of the downstream side orifice base 1*d* is formed larger than the outer diameters of the upstream side orifice base 1*b* and the middle orifice base 1*k*. Also, the outer peripheral edge portion of the inner end face of the downstream side orifice base 1*d* serves as the sealing face 1*h*, and the flow dividing passage 1*m*, formed in the middle orifice base 1*k*, divergingly communicates with the passage 1*j* of the middle orifice base 1*k*. Moreover, the circular recess 1*i* is formed concentrically with the passage 1*c* in the outer end face of the downstream side orifice base 1*d*, and the bottom face of the recess 1*i*, formed in the outer end face of the orifice base 1*d*, functions as the sealing face 1*g* of the gasket type orifice 1.

The gasket type orifice 1 shown in FIG. 18 is also capable of providing advantageous effects that are the same as those of the gasket type orifice 1 shown in FIG. 5. In addition, because the upstream side orifice base 1*b*, the middle orifice base 1*k*, the downstream side orifice base 1*d*, the upstream side orifice part 1*l*, and the downstream side orifice part 1*o*, are all integrated in this gasket type orifice 1 embodiment, there is no external leak from either of the two orifice parts 1*l* and 1*o*.

In addition, in accordance with the gasket type orifice 1 embodiments shown in FIGS. 1 and 5, the convex orifice base 2 and the concave orifice base 3 are, respectively, disposed on the upstream side and the downstream side, wherein the outer diameter of the concave orifice base 3, located on the downstream side, is formed larger than the outer diameter of the convex orifice base 2, located on the upstream side, and the outer peripheral edge portion of the inner end face of the concave orifice base 3 serves as the sealing face 3*d*. However, in other embodiments of the present invention, although not illustrated, the gasket type orifice 1 may be configured so that the concave orifice base 3 and the convex orifice base 2 are respectively disposed on the upstream side and the downstream side (i.e., a reverse configuration compared to that of FIGS. 1 and 5), and the outer diameter of the convex orifice base 2, located on the downstream side, may be formed larger than the outer diameter of the concave orifice base 3, located on the upstream side, and the outer peripheral edge portion of the inner end face of the convex orifice base 2 may serve as a sealing face.

In accordance with the gasket type orifice 1 embodiments shown in FIGS. 1 and 5, the convex orifice base 2, the concave orifice base 3, and the middle orifice base 5, are formed from stainless steel materials (SUS316L-P (W melt)), and the respective orifice plates 4, 4', and 4" are formed from stainless steel materials of the same quality as the respective orifice bases 2, 3, and 5, or they are made of stainless steel materials (NK clean Z) containing extremely low impurities. However, the materials of the respective orifice bases 2, 3, and 5, and the respective orifice plates 4, 4', and 4", may be changed depending on the types of fluids to be handled. Furthermore, the materials of the respective members of the gasket type orifices 1 embodiments shown in FIGS. 9, 12, and 15 to 18 may be made of stainless steel materials in the same way as the gasket type orifice 1 embodiments shown in FIGS. 1 and 5, or the types of the materials may be changed depending on the types of fluids to be handled.

In the gasket type orifice 1 embodiments shown in FIGS. 1, 5, 9, 12, and 15 to 18, the circular recesses 3*e* and 1*i* are formed concentrically with the passages 3*a* and 1*c* in the outer end faces of the downstream side orifice bases 3 and 1*d*, and the bottom faces of the recesses 3*e* and 1*i* formed in the outer end faces of the downstream side concave orifice bases 3 and 1*d* function as the sealing faces 3*c* and 1*g* of the gasket type orifice 1. However, in other embodiments of the present invention, although not illustrated, the outer end faces of the downstream side orifice bases 3 and 1*d* may be formed to be planar, and the planar portions may serve as sealing faces.

In the gasket type orifice 1 embodiment shown in FIG. 18, the hole diameter (inner diameter) of the passage 1*j* formed in the middle orifice base 1*k* and the hole diameter (inner diameter) of the flow dividing passage 1*m* are made substantially the same. However, in other embodiments of the present invention, although not illustrated, the hole diameter of the flow dividing passage 1*m* may be enlarged in a direction of the flow (i.e., in the horizontal direction in FIG. 18). In other words, the slit-like flow dividing passage 1*m*, which may be substantially equivalent in length to the passage 1*j*, may be formed so as to communicate with the passage 1*j* of the middle orifice base 1*k*. The hole diameter of the flow dividing passage 1*m* does not have any effect on flow rate control even if it is large, which does not bring about any particular problem to the system. In this way, provided that the hole diameter of the flow dividing passage 1*m* is made larger than the hole diameter of the passage 1*j*, it is possible to perform cutting work for the passage 1*j* of the middle orifice base 1*k*, and to perform processes for forming the orifice parts 1*l* and 1*o* from inside as well.

Figure 20:
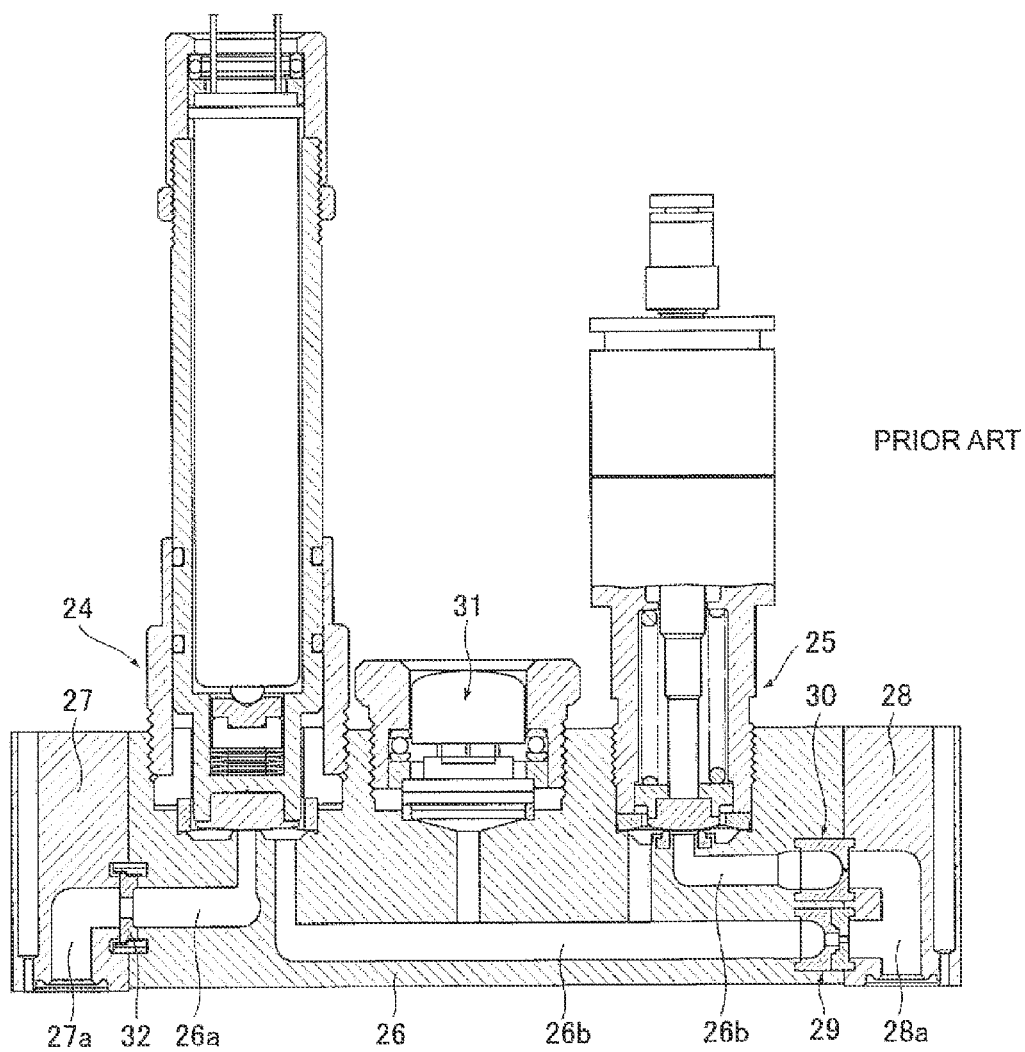
FIG. 20 is a longitudinal sectional view of a pressure type flow rate control apparatus in which the conventional gasket type orifice is employed.
Figure 21:
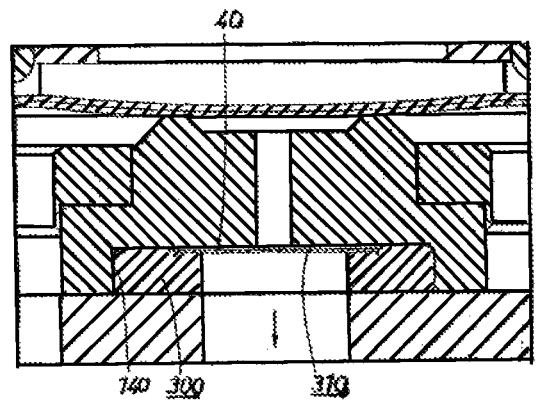
FIG. 21 illustrates a sectional view of a prior art orifice part that may be employed as a component of the present invention.
Figure 22:
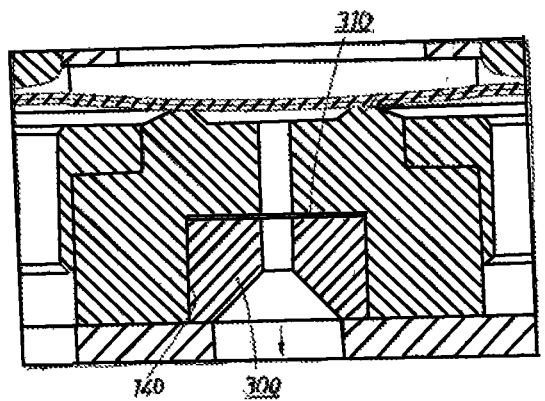
FIG. 22 illustrates a sectional view of another prior art orifice part that may be employed as a component of the present invention.

In the gasket type orifice 1 shown in FIG. 18, the upstream side orifice base 1*b*, the middle orifice base 1*k*, and the downstream side orifice base 1*d* are integrally formed from one member by cutting work, and the orifice part 1*l*, provided between the upstream side orifice base 1*b* and the middle orifice base 1*k*, and the orifice part 1*o*, provided between the middle orifice base 1*k* and the downstream side orifice base 1*d*, are formed so as to open a hole therein by cutting work using a drill, or the like. However, in other embodiments of the present invention, although not illustrated, the gasket type orifice 1 may be configured so that the upstream side orifice base 1*b*, the middle orifice base 1*k*, and the downstream side orifice base 1*d*, are integrally formed from one member by cutting work or the like, and an orifice part having a structure that is the same as that of an orifice body 4 shown in, for example, FIGS. 6 and 8 in Japanese Published Unexamined Patent Application No. 2000-213667, is fixedly fit into the orifice bases 1*b*, 1*k*, and 1*d*, which are integrally formed. Japanese Published Unexamined Patent Application No. 2000-213667 is incorporated herein by reference for all it discloses. FIGS. 21 and 22 of the present application correspond to FIGS. 6 and 8, respectively, of JP 2000-213667. FIGS. 20 and 21 illustrate the orifice body 40, a holder 300, and plate 310, and a depressed area 140. In other words, the gasket type orifice 1 may be configured so that counterbores (which correspond to a depressed area 14 shown in FIGS. 6 and 8 in Japanese Published Unexamined Patent Application No. 2000-213667) are respectively formed in the vicinity of the location where the upstream side orifice is disposed and in the vicinity of the location where the downstream side orifice is disposed in the orifice bases 1*b*, 1*k*, and 1*d*, which are integrally formed, and an orifice part (which corresponds to the orifice body 4 shown in FIGS. 6 and 8 in Japanese Published Unexamined Patent Application No. 2000-213667) includes an orifice plate and an orifice presser that is fixedly fit into the respective counterbores. The orifice part that is fixedly fit into the respective counterbores includes an annular orifice presser (which corresponds to a holder 30 shown in FIGS. 6 and 8 in Japanese Published Unexamined Patent Application No. 2000-213667) having a through hole formed in the central area thereof, which communicates with the passage 1*j* of the middle orifice base 1*k*, so that the annular orifice presser is accommodated in the counterbore, and an orifice plate (which corresponds to a plate 31 shown in FIGS. 6 and 8 in Japanese Published Unexamined Patent Application No. 2000-213667), having an orifice hole formed in the central area thereof, is employed so that its orifice hole makes the through hole in the orifice presser and the passage 1*j* of the middle orifice base 1*k* communicate with one another. Furthermore, the orifice plate may be fixed to the end face of the orifice presser by laser welding, or the orifice plate may be held between the bottom face of the counterbore and the orifice presser accommodated in the counterbore. The orifice part is fixedly fit into the respective counterbores of the orifice bases 1*b*, 1*k*, and 1*d*, which are integrally formed, by welding, press-fitting, or by screwing-in (i.e., a threaded connection). In this way, provided that the counterbores are formed in the orifice bases 1*b*, 1*k*, and 1*d*, which are integrally formed, and provided that the orifice part includes the orifice plate and the orifice presser that is fixedly fit into the counterbores, it is possible to work the interior to form the passage 1*j* of the middle orifice base 1*k* even in the case where the upstream side orifice base 1*b*, the middle orifice base 1*k*, and the downstream side orifice base 1d are integrally formed from one member by cutting work, or the like. U.S. Pat. No. 6,871,803 discloses valve structures in its figures that are similar to that of FIG. 8 of JP 2000-213667, and which may be employed as the orifice part in the present invention. U.S. Pat. No. 6,871, 803 is incorporated herein by reference for all that it discloses.

In the pressure type flow rate control apparatuses shown in FIGS. 7 and 14, the orifice plate 4', located on the upstream side, is constructed as the low flow rate orifice plate 4', and the orifice plate 4", located on the downstream side, is constructed as the high flow rate orifice plate 4", so that the pressure type flow rate control apparatus is capable of performing flow rate control for a low flow rate fluid and flow rate control for a high flow rate fluid by switching the fluid flow rate control range between a low flow rate region and a high flow rate region by activating the switching valve 13. However, in other embodiments of the present invention, the pressure type flow rate control apparatus may be configured so that two types of fluids to be circulated are supplied to the same passages (i.e., the upstream side fluid passage 7a and the downstream side fluid passage 7b of the control valve 6 and the flow dividing passage 7f). In these embodiments, when flowing one of the two fluids, the switching valve 13 is closed to control the flow rate of this first fluid with the control valve 6, and when flowing the other fluid of the two fluids, the switching valve 13 is opened to control the flow rate of the second fluid.

In the pressure type flow rate control apparatuses shown in FIGS. 7 and 14, the switching valve 13 is installed in the flow dividing passage 7f, which diverges from the downstream side fluid passage 7b of the control valve 6 to flow into the fluid passage 7b again, and the gasket type orifice 1 is installed at the junction point between the fluid passage 7b and the flow dividing passage 7f. However, in other embodiments of the present invention, although not illustrated, the pressure type flow rate control apparatus may be configured so that, in place of the flow dividing passage 7f diverging from the downstream side fluid passage 7b of the control valve 6, a flow passage (not illustrated) from another fluid supply line is connected to the fluid passage 7b, and the gasket type orifice 1 (i.e., the gasket type orifice 1 shown in FIG. 5, 12, or 16 to 18) communicates, respectively, with the fluid passage 7b and the other flow passage, and is installed at the connecting point, and the switching valve 13 is installed in the other flow passage to make the flowing fluid flow from the other flow passage using the switching valve 13.

INDUSTRIAL APPLICABILITY

The present invention can be applied to all kinds of fluid facilities employing orifices and fluid flow rate control apparatuses configured to perform flow rate control of fluid by use of orifices, and are mainly used, however, in the fields of semiconductor manufacturing, chemical industry, medical industry, food industry, and the like.

DESCRIPTION OF SYMBOLS

1: gasket type orifice; 1a: passage of upstream side orifice base; 1b: upstream side orifice base; 1c: passage of downstream side orifice base; 1d: downstream side orifice base; 1e: orifice part; 1e': orifice hole; 1f: sealing face of upstream side orifice base; 1g: sealing face of downstream side orifice base; 1h: sealing face of downstream side orifice base; 1j: passage of middle orifice base; 1k: middle orifice base; 1l: orifice part; 1l': orifice hole; 1m: flow dividing passage; 1o: orifice part; 1o': orifice hole; 2: convex orifice base; 2a: passage of convex orifice base; 2b: fitting protruding portion of convex orifice base; 2c: sealing face of convex orifice base; 3: concave orifice base; 3a: passage of concave orifice base; 3b: fitting concave portion of concave orifice base; 3c: sealing face of concave orifice base; 3d: sealing face of concave orifice base; 4: orifice plate; 4': low flow rate orifice plate; 4": high flow rate orifice plate; 5: middle orifice base; 5a: passage of middle orifice base; 5b: fitting concave portion of middle orifice base; 5c: fitting protruding portion of middle orifice base; 5d: flow dividing passage of middle orifice base; 6: control valve; 7b: downstream side fluid passage of control valve; 7f: flow dividing passage; 11: pressure sensor; 12: control circuit; 13: switching valve.

The invention claimed is:

1. A gasket type orifice installed in a fluid passage, wherein the gasket type orifice comprises:
   i. a first orifice base having a first through-type passage disposed in a central area thereof, the first orifice base having an outer end face and an inner end face, wherein a fitting protruding portion is disposed on the inner end face of the first orifice base, the first orifice base having a maximum outer diameter thereof;
   ii. a second orifice base having in a central area thereof a second through-type passage that communicates with the first passage of the first orifice base, the second orifice base having an outer end face and an inner end face, wherein a fitting concave portion is formed in the inner end face of the second orifice base; and
   iii. an orifice plate having an orifice hole formed in a central area thereof, wherein the orifice plate is mounted, by insertion in an airtight manner, between both an end face of the fitting protruding portion of the first orifice base and a bottom face of the fitting concave portion of the second orifice base,
   wherein the gasket type orifice is installed in the fluid passage, wherein outer end faces of the first orifice base and the second orifice base are disposed as a first sealing face and as a second sealing face, respectively, and a maximum outer diameter of the second orifice base located on a downstream side between the first orifice base and the second orifice base is formed larger than the maximum outer diameter of the first orifice base located on an upstream side, and an outer peripheral edge portion of the inner end face of the second orifice base, located on the downstream side, is disposed as a third sealing face.

2. The gasket type orifice installed in the fluid passage according to claim 1, wherein the fitting protruding portion of the first orifice base is fitted into the fitting concave portion of the second orifice base in an airtight manner, and the fitting part of the fitting protruding portion and the fitting concave portion is located on the downstream side of the third sealing face of the second orifice base.

3. The gasket type orifice installed in the fluid passage according to claim 2, wherein the orifice plate has the orifice hole formed in the central area of the orifice plate in order to communicate with the first passage of the convex orifice base and to communicate with the second passage of the concave orifice base, and the orifice plate is mounted by insertion, in an airtight manner, between the fitting protruding portion of the convex orifice base and the fitting concave portion of the concave orifice base.

4. The gasket type orifice installed in a fluid passage according to claim 1, wherein a sealing face formed on the outer end face of the second orifice base is a bottom face of a recess provided in the outer end face of the second orifice base.

5. A pressure type flow rate control apparatus comprising:
   (A) a control valve;
   (B) the gasket type orifice installed in a fluid passage according to claim 1, wherein the fluid passage is a downstream side fluid passage of the control valve;
   (C) a pressure sensor installed on an upstream side of the gasket type orifice in order to detect pressure on the upstream side of the gasket type orifice; and
   (D) a control circuit operably connected to control the control valve, wherein the pressure type flow rate control apparatus is configured to control an orifice passing flow rate by opening and closing the control valve using the pressure on the upstream side of the gasket type orifice while calculating an orifice passing flow rate.

6. The pressure type flow rate control apparatus according to claim 5, wherein, an annular protrusion that closely contacts to dig into a sealing face ($2c$) to seal and an annular protrusion ($7e$) that closely contacts to dig into the sealing face ($3d$) to seal are formed on a bottom face of the smaller diameter part of the orifice storage recess ($7c$) and a bottom face of the larger diameter part of the orifice storage recess ($7c$), respectively.

\* \* \* \* \*